US011921610B2

(12) United States Patent
Gunda et al.

(10) Patent No.: US 11,921,610 B2
(45) Date of Patent: *Mar. 5, 2024

(54) CORRELATION KEY USED TO CORRELATE FLOW AND CONTEXT DATA

(71) Applicant: VMware LLC, Palo Alto, CA (US)

(72) Inventors: Laxmikant Vithal Gunda, San Jose, CA (US); Arnold Poon, San Mateo, CA (US); Farzad Ghannadian, Burlingame, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/734,250

(22) Filed: May 2, 2022

(65) Prior Publication Data

US 2022/0261330 A1   Aug. 18, 2022

Related U.S. Application Data

(63) Continuation of application No. 16/745,248, filed on Jan. 16, 2020, now Pat. No. 11,321,213.

(51) Int. Cl.
*G06F 11/34* (2006.01)
*G06F 9/455* (2018.01)
*G06F 11/30* (2006.01)

(52) U.S. Cl.
CPC ...... *G06F 11/3452* (2013.01); *G06F 9/45558* (2013.01); *G06F 11/301* (2013.01); *G06F 2009/45591* (2013.01)

(58) Field of Classification Search
CPC ............. G06F 11/3452; G06F 9/45558; G06F 11/301; G06F 2009/45591
See application file for complete search history.

(56) References Cited

U.S. PATENT DOCUMENTS 5,636,128 A   6/1997   Sugimoto et al.
7,027,411 B1   4/2006   Pulsipher et al.
(Continued)

FOREIGN PATENT DOCUMENTS

EP   3716075 A1   9/2020
EP   3767553 A1   1/2021
(Continued)

OTHER PUBLICATIONS

Abbes, Tarek, et al., "Detection of Firewall Configuration Errors with Updatable Tree," International Journal of Information Security, May 2015, 17 pages, vol. 15, No. 3, Springer Verlag.
(Continued)

*Primary Examiner* — Benjamin C Wu
(74) *Attorney, Agent, or Firm* — Quarles & Brady LLP

(57) ABSTRACT

Some embodiments provide a novel method for collecting and reporting attributes of data flows associated with machines executing on a plurality of host computers to an analysis appliance. Some embodiments collect, each time a request for a new data message flow is initiated, a set of contextual attributes (i.e., context data) associated with the requested new data message flow. The method, in some embodiments, generates a correlation data set and provides the correlation data set to be included in flow data regarding the requested data message flow to be used by the analysis appliance to correlate context data and flow data received as separate data sets from multiple host computers.

14 Claims, 14 Drawing Sheets

(56) References Cited

U.S. PATENT DOCUMENTS

| | | |
|---|---|---|
| 7,065,079 B1 | 6/2006 | Patra et al. |
| 7,352,280 B1 | 4/2008 | Rockwood |
| 7,580,356 B1 | 8/2009 | Mishra et al. |
| 7,739,211 B2 | 6/2010 | Coffman et al. |
| 7,908,655 B1 | 3/2011 | Bhattacharyya et al. |
| 8,005,945 B2 | 8/2011 | Cohen et al. |
| 8,359,652 B2 | 1/2013 | Bhagwan et al. |
| 8,495,429 B2 | 7/2013 | Fu et al. |
| 8,499,348 B1 | 7/2013 | Rubin |
| 8,605,655 B1 | 12/2013 | Sahai et al. |
| 8,762,957 B2 | 6/2014 | Cobb et al. |
| 9,166,997 B1 | 10/2015 | Guo et al. |
| 9,215,213 B2 | 12/2015 | Bansal et al. |
| 9,218,527 B2 | 12/2015 | Lakshminarayan et al. |
| 9,223,767 B1 | 12/2015 | Powell et al. |
| 9,438,560 B2 | 9/2016 | Mohanty et al. |
| 9,438,634 B1 | 9/2016 | Ross et al. |
| 9,454,444 B1 | 9/2016 | Agarwal et al. |
| 9,467,476 B1 | 10/2016 | Shieh et al. |
| 9,497,206 B2 | 11/2016 | Bernstein et al. |
| 9,578,050 B1 | 2/2017 | Barabash et al. |
| 9,680,877 B2 | 6/2017 | Duffield et al. |
| 9,699,049 B2 | 7/2017 | Gupta et al. |
| 9,767,197 B1 | 9/2017 | Agarwal et al. |
| 9,787,641 B2 | 10/2017 | Bansal et al. |
| 9,792,447 B2 | 10/2017 | Thota et al. |
| 9,882,713 B1 | 1/2018 | Raza et al. |
| 9,891,940 B2 | 2/2018 | Feroz et al. |
| 9,998,339 B1 | 6/2018 | Brajkovic et al. |
| 10,129,162 B1 | 11/2018 | Faulk, Jr. |
| 10,257,227 B1 | 4/2019 | Stickle et al. |
| 10,298,505 B1 | 5/2019 | Grant et al. |
| 10,298,619 B2 | 5/2019 | Nimmagadda et al. |
| 10,324,746 B2 | 6/2019 | Kumar et al. |
| 10,419,321 B2 | 9/2019 | Raman et al. |
| 10,425,437 B1 | 9/2019 | Bog et al. |
| 10,432,707 B2 | 10/2019 | Hosie et al. |
| 10,521,584 B1 | 12/2019 | Mehr |
| 10,581,897 B1 | 3/2020 | Natanzon et al. |
| 10,735,282 B1 | 8/2020 | Singh et al. |
| 10,812,409 B2 | 10/2020 | Tiwary et al. |
| 10,887,337 B1 | 1/2021 | Kim et al. |
| 10,911,335 B1 | 2/2021 | Mordani et al. |
| 11,057,414 B1 | 7/2021 | Giorgio et al. |
| 11,140,090 B2 | 10/2021 | Mordani et al. |
| 11,150,976 B1 | 10/2021 | Marwah et al. |
| 11,176,157 B2 | 11/2021 | Mordani et al. |
| 11,188,570 B2 | 11/2021 | Jain et al. |
| 11,269,718 B1 | 3/2022 | Chen et al. |
| 11,288,256 B2 | 3/2022 | Jain et al. |
| 11,296,960 B2 | 4/2022 | Wang et al. |
| 11,321,213 B2 * | 5/2022 | Gunda .................. G06F 11/301 |
| 11,340,931 B2 | 5/2022 | Krishna et al. |
| 11,343,262 B2 | 5/2022 | Junod et al. |
| 11,347,896 B2 | 5/2022 | Brown, Jr. et al. |
| 11,349,876 B2 | 5/2022 | Krishna et al. |
| 11,374,952 B1 | 6/2022 | Coskun et al. |
| 11,374,968 B1 | 6/2022 | Colón et al. |
| 11,398,987 B2 | 7/2022 | Jain et al. |
| 11,425,150 B1 | 8/2022 | Emanuel et al. |
| 11,436,075 B2 | 9/2022 | Jain et al. |
| 11,593,639 B1 | 2/2023 | Garg et al. |
| 11,616,708 B1 | 3/2023 | Chraim et al. |
| 2003/0120955 A1 | 6/2003 | Bartal et al. |
| 2003/0236677 A1 | 12/2003 | Casati et al. |
| 2004/0190724 A1 | 9/2004 | Dettinger et al. |
| 2005/0108444 A1 | 5/2005 | Flauaus et al. |
| 2005/0119001 A1 | 6/2005 | Watanabe |
| 2005/0262554 A1 | 11/2005 | Brooks et al. |
| 2005/0289219 A1 | 12/2005 | Nazzal |
| 2006/0085785 A1 | 4/2006 | Garrett |
| 2006/0168657 A1 | 7/2006 | Baentsch et al. |
| 2006/0174337 A1 | 8/2006 | Bernoth |
| 2006/0239203 A1 | 10/2006 | Talpade et al. |
| 2007/0011734 A1 | 1/2007 | Balakrishnan et al. |
| 2007/0016666 A1 | 1/2007 | Duffield et al. |
| 2007/0058632 A1 | 3/2007 | Back et al. |
| 2007/0147236 A1 | 6/2007 | Lee |
| 2008/0037423 A1 | 2/2008 | Singh et al. |
| 2008/0059596 A1 | 3/2008 | Ogawa |
| 2008/0196102 A1 | 8/2008 | Roesch |
| 2008/0196103 A1 | 8/2008 | Lin et al. |
| 2008/0263661 A1 | 10/2008 | Bouzida |
| 2008/0267186 A1 | 10/2008 | Boukis et al. |
| 2008/0281660 A1 | 11/2008 | Sajja et al. |
| 2008/0282335 A1 | 11/2008 | Abzarian et al. |
| 2009/0077663 A1 | 3/2009 | Sun et al. |
| 2009/0106228 A1 | 4/2009 | Weinman, Jr. |
| 2009/0300341 A1 | 12/2009 | Buehler et al. |
| 2010/0049968 A1 | 2/2010 | Dimitrakos et al. |
| 2010/0106764 A1 | 4/2010 | Chadwick et al. |
| 2010/0107085 A1 | 4/2010 | Chadwick et al. |
| 2010/0153316 A1 | 6/2010 | Duffield et al. |
| 2010/0211673 A1 | 8/2010 | Kosbab et al. |
| 2010/0241480 A1 | 9/2010 | Rokhlin et al. |
| 2010/0309812 A1 | 12/2010 | Marquez et al. |
| 2010/0325199 A1 | 12/2010 | Park et al. |
| 2010/0332262 A1 | 12/2010 | Horvitz et al. |
| 2011/0082962 A1 | 4/2011 | Horovitz et al. |
| 2011/0162039 A1 | 6/2011 | Trace et al. |
| 2011/0170413 A1 | 7/2011 | Shi et al. |
| 2012/0131591 A1 | 5/2012 | Moorthi et al. |
| 2012/0226808 A1 | 9/2012 | Morgan |
| 2012/0266231 A1 | 10/2012 | Spiers et al. |
| 2013/0041522 A1 | 2/2013 | Mori et al. |
| 2013/0067090 A1 | 3/2013 | Batrouni et al. |
| 2013/0085914 A1 | 4/2013 | Mcpherson et al. |
| 2013/0117567 A1 | 5/2013 | Chang et al. |
| 2013/0124753 A1 | 5/2013 | Ansari et al. |
| 2013/0185413 A1 | 7/2013 | Beaty et al. |
| 2013/0198459 A1 | 8/2013 | Joshi et al. |
| 2013/0212255 A1 | 8/2013 | Chao et al. |
| 2013/0227687 A1 | 8/2013 | Lee |
| 2013/0254766 A1 | 9/2013 | Zuo et al. |
| 2013/0297768 A1 | 11/2013 | Singh |
| 2014/0019964 A1 | 1/2014 | Neuse et al. |
| 2014/0075564 A1 | 3/2014 | Singla et al. |
| 2014/0089506 A1 | 3/2014 | Naga et al. |
| 2014/0207918 A1 | 7/2014 | Kowalski et al. |
| 2014/0230008 A1 | 8/2014 | Feroz et al. |
| 2014/0245423 A1 | 8/2014 | Lee |
| 2014/0282591 A1 | 9/2014 | Stich et al. |
| 2014/0310513 A1 | 10/2014 | Barney et al. |
| 2015/0113529 A1 | 4/2015 | Zhong |
| 2015/0124608 A1 | 5/2015 | Agarwal et al. |
| 2015/0135003 A1 | 5/2015 | Cota-Robles et al. |
| 2015/0156214 A1 | 6/2015 | Kaminsky |
| 2015/0180892 A1 | 6/2015 | Balderas |
| 2015/0181394 A1 | 6/2015 | Zuniga et al. |
| 2015/0207813 A1 | 7/2015 | Reybok et al. |
| 2015/0281056 A1 | 10/2015 | Liljenstolpe |
| 2015/0281065 A1 | 10/2015 | Liljenstolpe |
| 2015/0286783 A1 | 10/2015 | Kumar et al. |
| 2015/0304349 A1 | 10/2015 | Bernstein et al. |
| 2015/0355957 A1 | 12/2015 | Steiner et al. |
| 2015/0358391 A1 * | 12/2015 | Moon .................... H04L 67/10 |
| | | 709/224 |
| 2016/0050589 A1 | 2/2016 | Safavi |
| 2016/0080404 A1 | 3/2016 | Kohout et al. |
| 2016/0087847 A1 | 3/2016 | Krithivas et al. |
| 2016/0087859 A1 | 3/2016 | Kuan et al. |
| 2016/0156591 A1 | 6/2016 | Zhou et al. |
| 2016/0191306 A1 | 6/2016 | Gasparakis et al. |
| 2016/0191413 A1 | 6/2016 | Feroz et al. |
| 2016/0191463 A1 | 6/2016 | Mohanty et al. |
| 2016/0191521 A1 | 6/2016 | Feroz et al. |
| 2016/0216994 A1 | 7/2016 | Sefidcon et al. |
| 2016/0218951 A1 | 7/2016 | Vasseur et al. |
| 2016/0294800 A1 | 10/2016 | Oppenheim, Jr. et al. |
| 2016/0294987 A1 | 10/2016 | Tian et al. |
| 2016/0301603 A1 | 10/2016 | Park et al. |
| 2016/0308898 A1 | 10/2016 | Teeple et al. |
| 2016/0350683 A1 | 12/2016 | Bester et al. |
| 2016/0352765 A1 | 12/2016 | Mermoud et al. |

(56) References Cited

U.S. PATENT DOCUMENTS

| | | |
|---|---|---|
| 2016/0359759 A1 | 12/2016 | Singh et al. |
| 2016/0380812 A1 | 12/2016 | Chanda et al. |
| 2016/0380884 A1 | 12/2016 | Sarikaya et al. |
| 2017/0005986 A1 | 1/2017 | Bansal et al. |
| 2017/0078168 A1 | 3/2017 | Harris et al. |
| 2017/0126677 A1 | 5/2017 | Kumar et al. |
| 2017/0134247 A1 | 5/2017 | Hoja et al. |
| 2017/0149804 A1 | 5/2017 | Kolbitsch et al. |
| 2017/0207968 A1 | 7/2017 | Eicken et al. |
| 2017/0212799 A1 | 7/2017 | Konireddygari |
| 2017/0214634 A1 | 7/2017 | Li |
| 2017/0223046 A1 | 8/2017 | Singh |
| 2017/0272452 A1 | 9/2017 | Kraemer et al. |
| 2017/0279687 A1 | 9/2017 | Muntés-Mulero et al. |
| 2017/0293994 A1 | 10/2017 | Li et al. |
| 2017/0324632 A1 | 11/2017 | Arora |
| 2017/0359217 A1 | 12/2017 | Ahuja et al. |
| 2017/0374102 A1 | 12/2017 | Woolward |
| 2017/0374106 A1 | 12/2017 | Hamou et al. |
| 2018/0007005 A1 | 1/2018 | Chanda et al. |
| 2018/0007127 A1 | 1/2018 | Salapura et al. |
| 2018/0027080 A1 | 1/2018 | Yang et al. |
| 2018/0032399 A1 | 2/2018 | Johnson et al. |
| 2018/0034856 A1 | 2/2018 | Mallya |
| 2018/0041578 A1 | 2/2018 | Lee et al. |
| 2018/0048623 A1 | 2/2018 | Bansal et al. |
| 2018/0054456 A1 | 2/2018 | Ground et al. |
| 2018/0063164 A1 | 3/2018 | Balasubramanian et al. |
| 2018/0063178 A1 | 3/2018 | Jadhav et al. |
| 2018/0077119 A1 | 3/2018 | Fields et al. |
| 2018/0077120 A1 | 3/2018 | Baughman et al. |
| 2018/0077189 A1 | 3/2018 | Doppke et al. |
| 2018/0084034 A1 | 3/2018 | Netto et al. |
| 2018/0088964 A1 | 3/2018 | Hussain et al. |
| 2018/0091485 A1 | 3/2018 | Lee et al. |
| 2018/0101371 A1 | 4/2018 | Flanakin et al. |
| 2018/0123907 A1 | 5/2018 | Raman et al. |
| 2018/0123939 A1 | 5/2018 | Raman et al. |
| 2018/0145999 A1 | 5/2018 | Ertugrul et al. |
| 2018/0167405 A1 | 6/2018 | Comay et al. |
| 2018/0176102 A1 | 6/2018 | Bansal et al. |
| 2018/0176252 A1 | 6/2018 | Nimmagadda et al. |
| 2018/0176261 A1 | 6/2018 | Bansal et al. |
| 2018/0181423 A1 | 6/2018 | Gunda et al. |
| 2018/0181754 A1 | 6/2018 | Gunda |
| 2018/0183757 A1 | 6/2018 | Gunda et al. |
| 2018/0183759 A1 | 6/2018 | Gunda et al. |
| 2018/0183761 A1 | 6/2018 | Gunda et al. |
| 2018/0183764 A1* | 6/2018 | Gunda .................. G06F 21/50 |
| 2018/0183866 A1* | 6/2018 | Gunda ................ G06F 9/45558 |
| 2018/0189667 A1 | 7/2018 | Tsou et al. |
| 2018/0234333 A1 | 8/2018 | Inamdar et al. |
| 2018/0248904 A1 | 8/2018 | Villella et al. |
| 2018/0270189 A1 | 9/2018 | Montenot et al. |
| 2018/0270308 A1 | 9/2018 | Shea et al. |
| 2018/0287876 A1 | 10/2018 | Strobel et al. |
| 2018/0288063 A1 | 10/2018 | Koottayi et al. |
| 2018/0295036 A1 | 10/2018 | Krishnamurthy et al. |
| 2018/0316704 A1 | 11/2018 | Durairaj et al. |
| 2018/0324199 A1 | 11/2018 | Crotinger et al. |
| 2019/0007292 A1 | 1/2019 | Nevo et al. |
| 2019/0036956 A1* | 1/2019 | Gunda ................. H04L 41/046 |
| 2019/0065739 A1 | 2/2019 | Manadhata et al. |
| 2019/0065762 A1 | 2/2019 | Kim et al. |
| 2019/0075056 A1 | 3/2019 | Lu et al. |
| 2019/0138423 A1 | 5/2019 | Agerstam et al. |
| 2019/0158520 A1 | 5/2019 | DiValentin et al. |
| 2019/0163900 A1 | 5/2019 | Zhang et al. |
| 2019/0166008 A1 | 5/2019 | Gintis et al. |
| 2019/0171474 A1 | 6/2019 | Malboubi et al. |
| 2019/0180141 A1 | 6/2019 | Tiagi et al. |
| 2019/0182276 A1 | 6/2019 | Tiagi et al. |
| 2019/0182281 A1 | 6/2019 | Neil et al. |
| 2019/0199599 A1 | 6/2019 | Zavesky et al. |
| 2019/0266004 A1 | 8/2019 | Kumar et al. |
| 2019/0280949 A1 | 9/2019 | Wang et al. |
| 2019/0303562 A1 | 10/2019 | Masputra et al. |
| 2019/0319863 A1 | 10/2019 | Gupta et al. |
| 2019/0342335 A1 | 11/2019 | Ni et al. |
| 2019/0373007 A1 | 12/2019 | Salunke et al. |
| 2019/0373052 A1 | 12/2019 | Pollitt et al. |
| 2019/0379612 A1 | 12/2019 | Tiwary et al. |
| 2019/0392329 A1 | 12/2019 | Rangarajan et al. |
| 2020/0028756 A1* | 1/2020 | Hale .................. H04L 41/0266 |
| 2020/0084087 A1 | 3/2020 | Sharma et al. |
| 2020/0100145 A1 | 3/2020 | Enqvist et al. |
| 2020/0128043 A1 | 4/2020 | Xie |
| 2020/0162407 A1 | 5/2020 | Tillotson |
| 2020/0167258 A1 | 5/2020 | Chattopadhyay et al. |
| 2020/0167784 A1 | 5/2020 | Kursun |
| 2020/0183947 A1 | 6/2020 | Reeve et al. |
| 2020/0193031 A1 | 6/2020 | Avraham et al. |
| 2020/0210260 A1 | 7/2020 | Prabhakar et al. |
| 2020/0244676 A1 | 7/2020 | Amit et al. |
| 2020/0310884 A1 | 10/2020 | Villalobos et al. |
| 2020/0396075 A1 | 12/2020 | Visegrady et al. |
| 2020/0396254 A1 | 12/2020 | Crabtree et al. |
| 2021/0006642 A1 | 1/2021 | He et al. |
| 2021/0026677 A1 | 1/2021 | Krishna et al. |
| 2021/0026720 A1 | 1/2021 | Jain et al. |
| 2021/0026830 A1 | 1/2021 | Jain et al. |
| 2021/0026863 A1 | 1/2021 | Mordani et al. |
| 2021/0026870 A1 | 1/2021 | Jain et al. |
| 2021/0028996 A1 | 1/2021 | Mordani et al. |
| 2021/0029002 A1* | 1/2021 | Mordani ............. H04L 63/1425 |
| 2021/0029050 A1* | 1/2021 | Jain ........................ H04L 43/04 |
| 2021/0029051 A1 | 1/2021 | Mordani et al. |
| 2021/0029166 A1* | 1/2021 | Krishna ................. G06N 20/00 |
| 2021/0075789 A1 | 3/2021 | Wen et al. |
| 2021/0084074 A1 | 3/2021 | Kirner et al. |
| 2021/0099473 A1 | 4/2021 | Fainberg et al. |
| 2021/0110282 A1 | 4/2021 | McCann et al. |
| 2021/0110407 A1 | 4/2021 | Albero et al. |
| 2021/0136101 A1 | 5/2021 | Ben-Yosef et al. |
| 2021/0185073 A1 | 6/2021 | Ewaida et al. |
| 2021/0185085 A1 | 6/2021 | Wang et al. |
| 2021/0203684 A1 | 7/2021 | Maor et al. |
| 2021/0218770 A1 | 7/2021 | Ben-Yosef et al. |
| 2021/0219219 A1 | 7/2021 | Sundararaj et al. |
| 2021/0224179 A1 | 7/2021 | Gunda et al. |
| 2021/0243212 A1 | 8/2021 | Bowman et al. |
| 2021/0248240 A1 | 8/2021 | Comish et al. |
| 2021/0264025 A1 | 8/2021 | Givental et al. |
| 2021/0281591 A1 | 9/2021 | Furtak |
| 2021/0344689 A1 | 11/2021 | Mehr |
| 2021/0350248 A1 | 11/2021 | Rogers et al. |
| 2021/0367842 A1 | 11/2021 | Guillou et al. |
| 2022/0014560 A1 | 1/2022 | Crabtree et al. |
| 2022/0070699 A1 | 3/2022 | Thiyagarajan et al. |
| 2022/0210126 A1 | 6/2022 | Keiser |
| 2022/0215453 A1 | 7/2022 | Achan et al. |
| 2022/0224721 A1 | 7/2022 | Bertiger et al. |
| 2022/0239675 A1 | 7/2022 | Panse et al. |
| 2022/0239683 A1 | 7/2022 | Kaliya et al. |
| 2022/0253531 A1 | 8/2022 | Kim et al. |
| 2022/0269577 A1 | 8/2022 | Gechman et al. |
| 2022/0365806 A1 | 11/2022 | Krishna et al. |
| 2022/0385647 A1 | 12/2022 | Pabón et al. |
| 2022/0407897 A1 | 12/2022 | Raghuvanshi et al. |
| 2022/0417096 A1 | 12/2022 | Vutukuri et al. |
| 2023/0011043 A1 | 1/2023 | Panse et al. |

(56) References Cited

U.S. PATENT DOCUMENTS

2023/0011397 A1 1/2023 Panse et al.
2023/0011957 A1 1/2023 Panse et al.

FOREIGN PATENT DOCUMENTS

WO 2006091175 A1 8/2006
WO 2016003262 A1 1/2016

OTHER PUBLICATIONS

El-Atawy, Adel, et al., "Policy Segmentation for Intelligent Firewall Testing," 1st IEEE ICNP Workshop on Secure Network Protocols, Nov. 6, 2005, 6 pages, IEEE, Boston, MA, USA.

Oliveira, Ricardo M., et al., "Automatic Detection of Firewall Misconfigurations Using Firewall and Network Routing Policies," Jan. 2009, 6 pages.

Ring, Markus, et al., "Detection of Slow Port Scans in Flow-Based Network Traffic," PLOS One, Sep. 25, 2018, 18 pages, retrieved from https://journals.plos.org/plosone/article?id=10.1371/journal.pone.0204507.

Turcotte, Melissa J. M., et al., "Unified Host and Network Data Set", Aug. 24, 2017, 16 pages, arXiv:1708.07518v1, arXiv.org, Cornell University, Ithaca, NY, USA.

Waye, Lucas, et al., "Cryptographically Secure Information Flow Control on Key-Value Stores," CCS '17: Proceedings of the 2017 ACM SIGSAC Conference on Computer and Communications Security, Oct. 30-Nov. 3, 2017, 15 pages, ACM, Dallas, TX, USA.

Arbuthnot, Tom, "What are Thresholds for Good and Poor Network Packet Loss, Jitter and Round Trip Time for Unified Communications?", Tom Talks, May 17, 2018, 7 pages, retrieved from https://tomtalks.blog/what-are-thresholds-for-good-and-poor-network-packet-loss-jitter-and-round-trip-time-for-unified-communications/.

* cited by examiner

CORRELATION KEY USED TO CORRELATE FLOW AND CONTEXT DATA

CLAIM OF BENEFIT TO PRIOR APPLICATIONS

This application is a continuation application of U.S. patent application Ser. No. 16/745,248, filed Jan. 16, 2020, now published as U.S. Patent Publication 2021/0224179. U.S. patent application Ser. No. 16/745,248, now published as U.S. Patent Publication 2021/0224179, is hereby incorporated by reference.

BACKGROUND

Software-defined data centers (SDDCs) in theory provide large amounts of data that can be used for many different applications. However, in practice, the data is fragmented and difficult for users to analyze. A solution is required to provide an infrastructure for providing a platform that can be accessed to perform analytics and to visualize the security posture of a SDDC.

BRIEF SUMMARY

Some embodiments provide a novel method for collecting and reporting attributes of data flows associated with machines executing on a plurality of host computers. In some embodiments, the machines are associated with a logical network implemented by a virtualization manager (e.g., VMware™ NSX manager). The logical network, in some embodiments, is implemented as an overlay network over a physical network and uses managed forwarding elements executing on host computers associated with the logical network. The collected data is reported to a policy, analytics, and correlation engine appliance (an analysis appliance). The analysis appliance is a server (or cluster of servers) that receives reports from each host computer and configuration data from a network manager computer, processes the data to be stored in a time series data storage, and performs analysis on the stored data. In some embodiments, the analysis appliance also provides access to the stored data to additional elements of the system for visualization and alternative analysis.

Each host computer, in some embodiments, is responsible for collecting and reporting attributes of data flows associated with machines executing on the host computer. In some embodiments, the host computer includes: a flow exporter that processes and publishes flow data to the analysis appliance, a set of guest introspection (GI) agents for collecting context data relating to the flows from machines (e.g., data compute nodes [DCNs], virtual machines, containers, etc.) executing on the host, a set of third-party programs or processes that provide additional context data, an anomaly detection engine and a machine learning engine that analyze flow data and context data and provide additional context data, and a context exporter for processing and publishing context data to the analysis appliance. Additional details of the hosts and the analysis appliance are discussed in U.S. patent application Ser. No. 16/554,370, filed Aug. 28, 2019, now issued as U.S. Pat. No. 11,340,931, which is hereby incorporated by reference.

Some embodiments collect, each time a request for a new data message flow is initiated, a set of contextual attributes (i.e., context data) associated with the requested new data message flow. The contextual attributes, in some embodiments, include attributes at layer 7 (L7) of the Open Systems Interconnection (OSI) model. The attributes collected, in some embodiments, include one or more of a user identifier (ID), a virtual machine ID, a security ID (SID), a process ID, and a command line associated with the request along with additional contextual attributes at other layers (e.g., layer 3 and layer 4) of the OSI model.

Once the contextual attributes are collected, some embodiments provide sets of collected attributes to a service engine or service engines executing on the host computer that provide services for data messages of data message flows. The set of collected attributes sent to a particular service engine will depend on the service to be performed and the information necessary to perform the service. In some embodiments, a set of correlation data is generated based on the collected attributes that is meant to be appended or inserted into flow data (i.e., a record associated with the requested flow) that is collected by, for example, a flow exporter. The generated correlation data set, in some embodiments, includes a first value based on a user ID and a second value based on the identity of a process (or application) requesting the new data message flow. In some embodiments, the first and second values are the user ID and a process hash associated with the requested flow. In some embodiments, the value based on the process identity is also based on a command line interface (CLI) parameter (e.g., is a process instance identifier) associated with the requested flow. The process instance identifier (e.g., a process key), in some embodiments, is used to identify the process and CLI parameter associated with the flow to provide fine-grained analysis at an analysis appliance that receives the flow data and contextual data from each host computer.

The generated correlation data set, in some embodiments, is provided to the flow exporter along with a set of header values that identify the requested flow. The flow exporter, in such embodiments, identifies the generated correlation data set to append to the flow data by matching header values of a received data message in the flow with the header values associated with the generated correlation data set. In other embodiments, the flow exporter makes a request to a context engine of a context exporter to collect the generated correlation data set for each data message in a new data message flow (i.e., upon receiving a SYN packet of a flow) and appends the collected correlation data to each subsequent data message of the data message flow. In either embodiment, the flow exporter processes the data message with the appended generated correlation data set (or appends them after processing) and exports the flow data, including the generated correlation data set, to the analysis appliance.

The analysis appliance, in some embodiments, receives context data and flow data from multiple host computers and performs initial processing to aggregate flow data received from the multiple hosts into aggregated flow group records. In some embodiments, an initial processing to aggregate context data received from multiple hosts into aggregated context data is performed independently. The aggregation operations performed on the flow and context data, in some embodiments, deduplicate (e.g., combine) records for a same flow that are received from a source and destination host computer.

The aggregated flow group records and the context data are stored by the analysis appliance to be used in providing a set of functions (e.g., responding to user queries and generating visualizations in response to the user queries, providing anomaly detection, providing vulnerability analysis, generating recommendations, etc.). The stored flow group records and context data are correlated, in some embodiments, periodically to provide data for an anomaly detection engine or other analysis components of the analysis device. Additionally, or alternatively, some embodiments, correlate stored flow group records and context data upon receiving a request by a user for specific data.

The data correlation, in some embodiments, is performed using at least a portion of the correlation data (e.g., the user ID, the process hash, the process instance identifier, or a user ID/process hash pair) stored in the flow data and the corresponding data stored in the context data. The data correlation, in some embodiments, identifies a client-server pair at the application level using a combination of at least one of the user ID, the process ID, the CLI parameter data, and an n-tuple (e.g., a 5-tuple) that identifies ports used for a specific data message flow that are found in the correlated data (e.g., data in either of a flow group record or the context data that is identified using the generated correlation data stored in the flow group record). Additional details of the analysis appliance are discussed in U.S. patent application Ser. No. 16/554,370.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and the Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
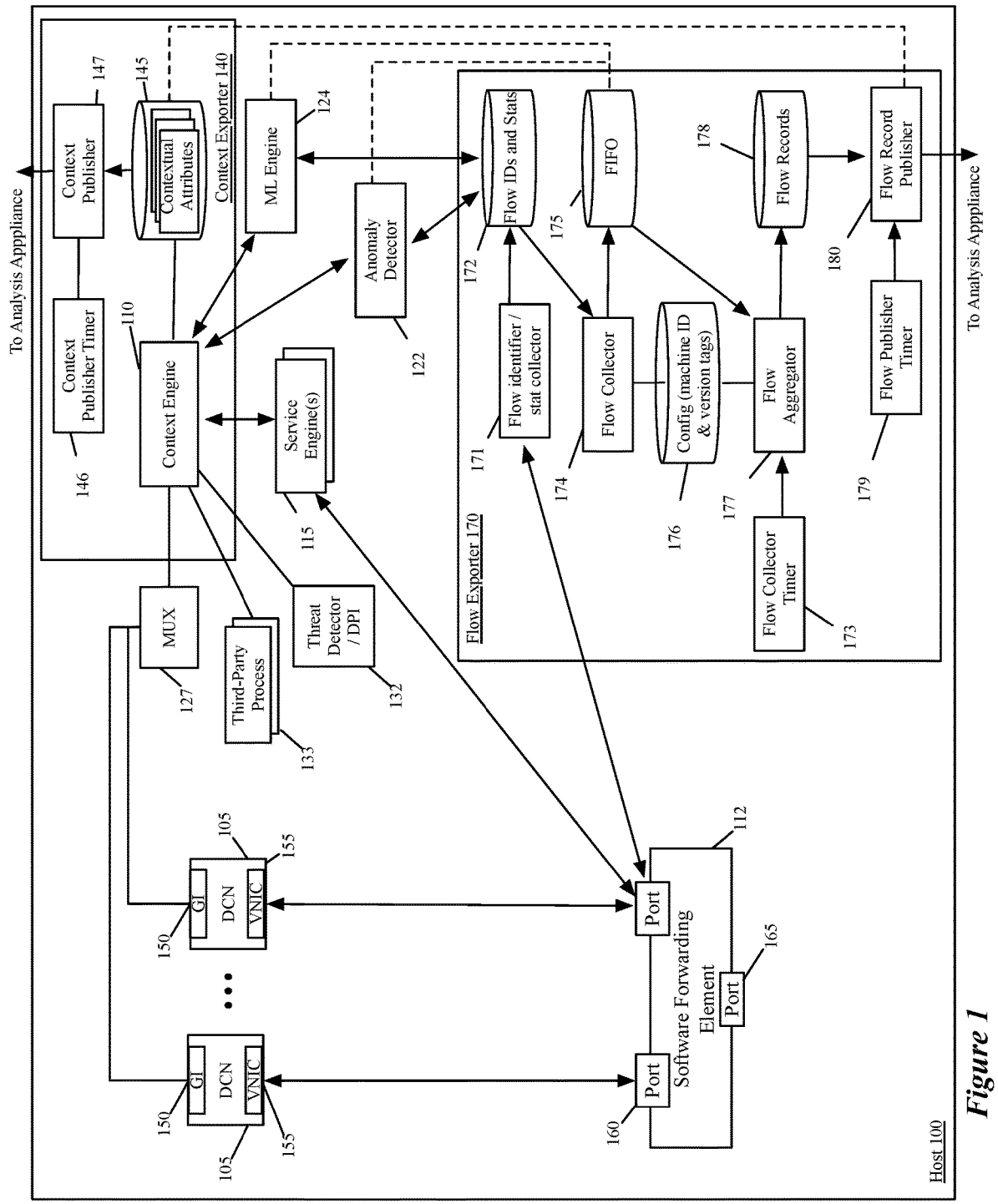
FIG. 1 illustrates a host computer that uses a context exporter and a flow exporter to collect, aggregate, and publish aggregated data to an analysis appliance.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method for collecting and reporting attributes of data flows associated with machines executing on a plurality of host computers. In some embodiments, the machines are associated with a logical network implemented by a virtualization manager (e.g., VMware™ NSX manager). The logical network, in some embodiments, is implemented as an overlay network over a physical network and uses managed forwarding elements executing on host computers associated with the logical network. The collected data is reported to a policy, analytics, and correlation engine appliance (an analysis appliance). The analysis appliance is a server (or cluster of servers) that receives reports from each host computer and configuration data from a network manager computer, processes the data to be stored in a time series data storage, and performs analysis on the stored data. In some embodiments, the analysis appliance also provides access to the stored data to additional elements of the system for visualization and alternative analysis.

As used in this document, data messages refer to a collection of bits in a particular format sent across a network. Also, as used in this document, a data flow refers to a set of data messages sharing a set of attributes (e.g. a five-tuple) even if the shared set of attributes has the source and destination values switched for different directions of communication (i.e., from a first machine to a second machine and from the second machine back to the first machine). Data flows (or flows) as used in this document, in some instances, refer to one half of a communication between two machines (i.e., a flow refers, in some cases, to the communication from one machine to another machine in one direction). One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, layer 7) are references, respectively, to the second data link layer, the third network layer, the fourth transport layer, and the seventh application layer of the OSI (Open System Interconnection) layer model.

Each host computer, in some embodiments, is responsible for collecting and reporting attributes of data flows associated with machines executing on a host computer. In some embodiments, the host computer includes: a flow exporter that provides flow data to an analysis appliance, a set of guest introspection (GI) agents for collecting context data relating to the flows from machines (e.g., data compute nodes [DCNs], virtual machines, containers, etc.) executing on the host, a set of third-party programs that provide additional context data, an anomaly detection engine that analyzes flow data and context data and provides additional context data, a machine learning engine that analyzes flow data and context data to make recommendations or perform preliminary processing to offload some of the processing at an upstream analysis appliance, a context engine for correlating the different sets of context data, and a set of publishers that communicate the context data and flow data to the appliance cluster for further processing. Additional details of the hosts and the analysis appliance are discussed in U.S. patent application Ser. No. 16/554,370, filed Aug. 28, 2019, which is hereby incorporated by reference.

FIG. 1 illustrates a host computer 100 that uses a context exporter 140 and a flow exporter 170 to collect, aggregate, and publish aggregated data to an analysis appliance. As shown, the host computer 100 includes: several data compute nodes (DCNs) 105, a set of guest introspection (GI) agents 150, a set of service engines 115 providing a set of services (e.g., a distributed firewall, load balancer, network address translation, etc.), a threat detector/deep packet inspection (DPI) module 132, a set of third-party processes 133, a multiplexer (MUX) 127, and the context exporter 140 (including a context engine 110, a contextual attribute storage 145, a context publisher timer 146, and a context publisher 147) for processing context data (e.g., contextual attribute data sets) at the host computer 100 and publishing the context data to an analysis appliance. Flow exporter 170, in some embodiments, includes a flow identifier/statistics collector 171, a flow identifier and statistics storage 172, a flow collector timer 173, a flow collector 174, a first-in first-out (FIFO) storage 175, a configuration data storage 176, a flow aggregator 177, a flow group record storage 178, a flow publisher timer 179, and a flow group record publisher 180 for collecting and processing flow data and publishing the processed flow data as a set of flow group records to an analysis appliance. The host computer 100, in some embodiments, also includes an anomaly detector 122 and a machine learning (ML) engine 124 that perform preliminary analysis based on the context data and flow data received from the flow exporter 170 (e.g., the flow identifiers and statistics stored in storage 172).

The guest introspection agents 150 execute on the DCNs 105 and extract context data from the DCNs 105. For example, a guest introspection agent 150, in some embodiments, detects that a new data flow has been initiated (e.g., by sending a SYN packet in a data flow using TCP) and collects introspection data (e.g., a set of attributes of the data flow and DCN). The introspection data, in some embodiments, includes any, or all, of data regarding (i) guest metadata, (ii) guest events, and (iii) guest DCN metrics. In some embodiments, the guest metadata includes any, or all, of data regarding DCN 105 (a universally unique identifier [UUID], a bios UUID, and a vmxpath), operating system data (type of OS and version information), and process data (e.g., process ID, creation time, hash, name, command line, security ID [SID], user ID [UID], loaded library or module information, process metrics [e.g., memory usage and CPU usage], process version, parent process ID, etc.). Guest events, in some embodiments, include DCN 105 events (e.g., power on and power off), user login events (e.g., login, logoff, connect, and disconnect events, a session ID, a timestamp, a DCN IP, and a connected client IP), and service process events (e.g., event type [e.g., listen start, listen stop], timestamp, destination DCN IP, destination port number, and process details). Guest DCN metrics, in some embodiments, include memory usage and CPU usage. One of ordinary skill in the art will appreciate that much of the context data, in some embodiments, is not included in the L2-L7 headers of a flow and that many additional pieces of information may be collected by guest introspection agent 150. The partial list above serves only as an example of the types of information that can be gathered by guest introspection agent 150.

The collected context information is sent, in some embodiments, to context engine 110 through MUX 127 to be provided to other elements of the host and for correlation with context data received from other sources. In some embodiments, the other sources include a set of service engines 115, threat detector/DPI module 132, third-party software (processes) 133, anomaly detector 122, and ML engine 124. Context data received from third-party software, in some embodiments, is collected using a library (e.g., a set of APIs provided by the third-party software) or a third-party agent executing on the host computer 100 for communicating with the third-party software. Context engine 110, in some embodiments, correlates the context data from the multiple sources for providing the correlated context data (e.g., sets of correlated contextual attributes) to the context publisher 147 (e.g., through context attribute storage 145).

Figure 2:
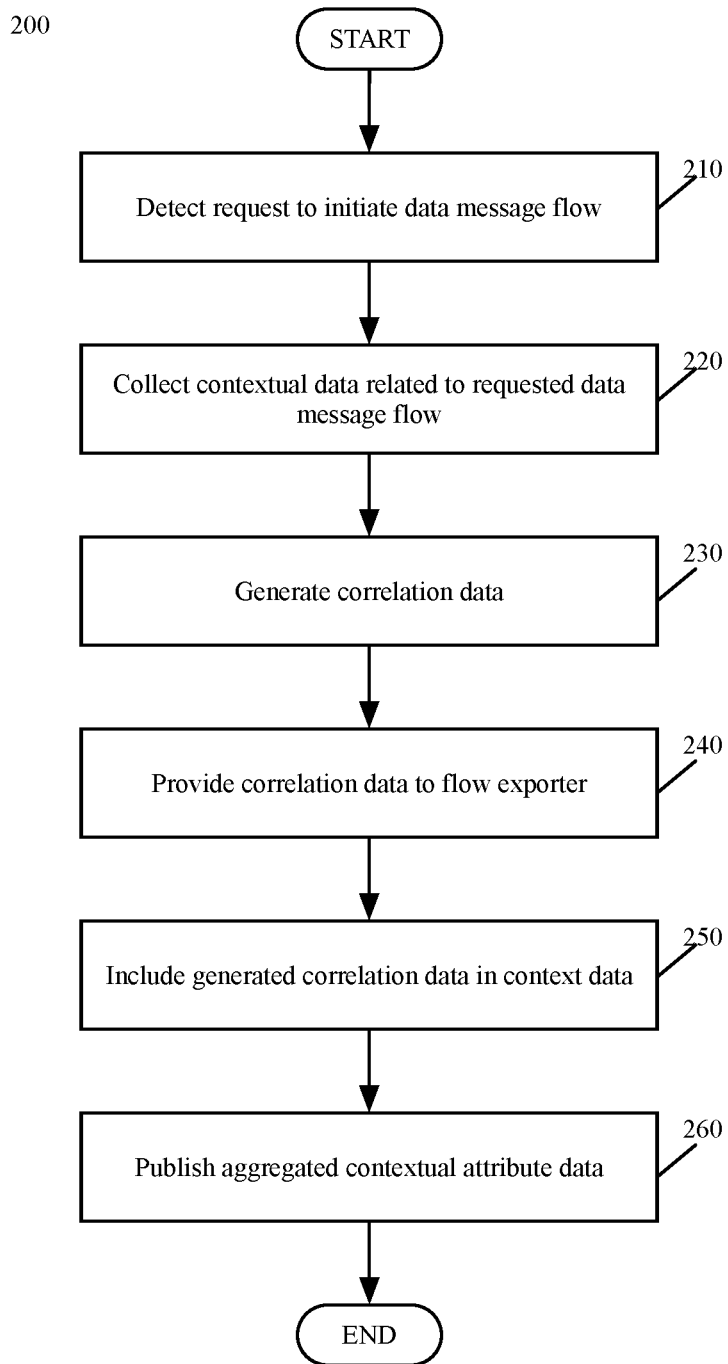
FIG. 2 conceptually illustrates a process for collecting context data including contextual attributes.

FIG. 2 conceptually illustrates a process 200 for collecting context data including contextual attributes. In some embodiments, process 200 is performed by elements of context exporter 140. The process 200 begins (at 210) by detecting a request for a new data message flow from a process (e.g., an application) executing on a source machine. In some embodiments, the request is detected using a guest introspection agent 150 on the source machine that reports the request to the context exporter 140.

Once a request has been detected (at 210), the process 200 collects (at 220) context data from at least one source of context data. The sources of context data, in different embodiments, are different combinations of any or all of a set of guest introspection agents (e.g., through a multiplexer), a set of service engines, a threat detector/DPI module, a third-party software (or processes), an anomaly detector, and an ML engine. The contextual data includes at least a user ID, a process hash, and a command line associated with the detected request. The user ID is any one of a Windows™ security ID (i.e., a globally unique ID generated for every user), or a modified Linux™ user ID (e.g., a user ID generated by appending the Linux user ID to a virtual machine (VM) universally unique ID (e.g., a VM VC UUID)), or some other universally unique ID (UUID). In some embodiments, the collection includes the correlation and aggregation of different sets of context data received from at least one source of context data. In some embodiments, the correlation is based on common attributes (e.g., context data from multiple sources include at least one of a UUID (e.g., a security ID (SID) or any of the other UUIDs described above), an IP address, a machine identifier, a process hash, etc.) with different context data sets having different common attributes that allow a complete set of context data to be stitched together.

Once related sets of context data are identified, some embodiments aggregate related contextual attributes into a single aggregated contextual attribute set. As process 200 is an ongoing process, the correlation and aggregation, in some embodiments, correlates and aggregates received data to previously stored correlated and aggregated context data. In some embodiments, the context data for each contextual attribute (e.g., source IP address, source port, destination IP address, destination port, protocol, SID, process hash, machine ID, version tag, service rules hit, CPU usage, memory usage, guest events, machine events, etc.) included in the sets of context data is concatenated in a corresponding field for the attribute. In other embodiments, only unique attribute values are added to the aggregated contextual attributes, or some combination of the two methods for aggregating data is used in conjunction with other methods that are appropriate for different attributes. Contextual attribute sets, in different embodiments, are aggregated for any or all of each machine executing on the host (e.g., by machine identifier or IP address), each process hash, each process hash/CLI parameter combination, each user, each of a set of flow tuples used to identify individual flows, or other groupings as might be desired by a user. In some embodiments, the aggregation criteria are dynamically adjustable by a user to be used for additional or alternative analysis.

After the context data has been collected (at 220), the process 200 continues by generating (at 230) a correlation data set (e.g., a correlation key). In some embodiments, the correlation data set includes a user ID and a process identifier. The process identifier, in some embodiments, is a process hash (e.g., an SHA-256 hash). In some embodiments, instead of or in addition to a process hash, the generated correlation data set includes a process instance identifier that is generated based on the process hash and a CLI parameter associated with the requested new data message flow. The process hash may be modified by appending a hash of the CLI parameter or by modifying a set of bits in the process hash based on the CLI parameter. For example, a number of possible unique CLI parameters can be determined for each process (or for a process that has the most possible unique CLI parameters) and a number of bits that can accommodate that many possibilities (e.g., 5 bits for 17-31 possible command lines) can be set aside in the process hash to be modified based on an equivalent number of bits in a hash of the CLI parameter. By generating the modified hash, a particular process (e.g., application) and CLI parameter combination can be identified using the process instance identifier by other system elements that have access to the process hash and CLI parameter information. One of ordinary skill in the art would appreciate that other identifiers of a user or process may be used in place of the user ID and process hash in a correlation data set (e.g., an SID and a process ID).

The process then provides (at 240) the generated correlation data set to the flow exporter for inclusion in exported flow records. The generated correlation data set is sent to the flow exporter, in some embodiments, in response to a request made to the context exporter (e.g., a context engine of the context exporter) upon receiving a first data message in a data message flow (e.g., a SYN packet). In some embodiments, the generated correlation data set are provided to the flow exporter along with an associated set of flow identifiers (e.g., an n-tuple) for every new flow independent of a request from the flow exporter to allow the flow exporter to append the generated correlation data to received data messages before exporting them to the analysis appliance.

In some embodiments, contextual attribute data is provided to additional system elements including any, or all, of: a service engine, an anomaly detection engine, an ML engine, and a threat detection module for the recipient element to provide a service or perform analysis based on the contextual attributes (along with data received from other sources, in some embodiments). The additional system elements, in some embodiments, provide additional context data that is included in the context data exported by the context exporter. In some embodiments, the attributes are provided to the other elements based on requests or queries from the other elements. The additional system elements (e.g., a service engine implementing a distributed firewall or other service) are responsible for providing the correlation data to the flow exporter after receiving it from the context exporter. Providing (at 240) the generated correlation data set to the flow exporter for inclusion in exported flow records, in some embodiments, is accomplished by providing the generated correlation data set to the service engine (e.g., the distributed firewall or other service).

In addition to providing (at 240) the generated correlation data set to the flow exporter, the process 200 includes (at 250) the generated correlation data in the context data to be exported to the analysis appliance. One of ordinary skill in the art will appreciate that after the correlation data set is generated (at 230), including (at 250) the generated correlation data in the context data to be exported to the analysis appliance and providing (at 240) the generated correlation data set to the flow exporter may be performed in any order as the two operations are independent.

After collecting the context data, the process 200 publishes (at 260) contextual attribute data, including the correlation data set, stored in the contextual attribute storage to an analysis appliance that performs further processing of the contextual attribute data. As discussed above, in some embodiments, the contextual attribute data that is published is organized into contextual attribute data sets based on machine identifiers, a set of key values, or a set of flow tuples. In some embodiments, publishing the contextual attribute data includes receiving a confirmation that the published data has been received at the analysis appliance. Additional details of the context data collection and publishing process can be found in U.S. patent application Ser. No. 16/554,370.

Going back to FIG. 1, as shown, each DCN 105 also includes a virtual network interface card (VNIC) 155 in some embodiments. Each VNIC 155 is responsible for exchanging messages between its DCN 105 and the software forwarding element (SFE) 112. Each VNIC 155 connects to a particular port 160-165 of the SFE 112. The SFE 112 also connects to a physical network interface card (PNIC) (not shown) of the host. In some embodiments, the VNICs 155 are software abstractions created by the hypervisor of one or more physical NICs (PNICs) of the host.

In some embodiments, the SFE 112 maintains a single port (e.g. port 160) for each VNIC 155 of each DCN 105. The SFE 112 connects to the host PNIC (through a NIC driver [not shown]) to send outgoing messages and to receive incoming messages. In some embodiments, the SFE 112 is defined to include a port 165 that connects to the PNIC's driver to send and receive messages to and from the PNIC. The SFE 112 performs message-processing operations to forward messages that it receives on one of its ports to another one of its ports. For example, in some embodiments, the SFE 112 tries to use data in the message (e.g., data in the message header) to match a message to flow-based rules, and upon finding a match, to perform the action specified by the matching rule (e.g., to hand the message to one of its ports 160-165, which directs the message to be supplied to a destination DCN 105 or to the PNIC).

In some embodiments, the SFE 112 is a software switch, while in other embodiments, it is a software router or a combined software switch/router. The SFE 112, in some embodiments, implements one or more logical forwarding elements (e.g., logical switches or logical routers) with SFEs 112 executing on other hosts in a multi-host environment. A logical forwarding element, in some embodiments, can span multiple hosts to connect DCNs that execute on different hosts but belong to one logical network.

Different logical forwarding elements can be defined to specify different logical networks for different users, and each logical forwarding element can be implemented by multiple software forwarding elements on multiple hosts. Each logical forwarding element isolates the traffic of the DCNs of one logical network from the DCNs of another logical network that is serviced by another logical forwarding element. A logical forwarding element can connect DCNs executing on the same host and/or different hosts, both within a datacenter and across datacenters. In some embodiments, the SFE 112 extracts from a data message a logical network identifier (e.g., a VNI) and a MAC address. The SFE 112, in these embodiments, uses the extracted VNI to identify a logical port group, and then uses the MAC address to identify a port within the port group.

Software switches (e.g., software switches of hypervisors) are sometimes referred to as virtual switches because they operate in software and they provide the DCNs with shared access to the PNIC(s) of the host. However, in this document, software switches are referred to as physical switches because they are items in the physical world. This terminology also differentiates software switches from logical switches, which are abstractions of the types of connections that are provided by the software switches. There are various mechanisms for creating logical switches from software switches. VXLAN provides one manner for creating such logical switches. The VXLAN standard is described in Mahalingam, Mallik; Dutt, Dinesh G.; et al. (2013-05-08), VXLAN: A Framework for Overlaying Virtualized Layer 2 Networks over Layer 3 Networks, IETF.

The ports 160-165 of the SFE 112, in some embodiments, include one or more function calls to one or more modules that implement special input/output (I/O) operations on incoming and outgoing messages that are received at the ports 160-165. Examples of I/O operations that are implemented by the ports 160-165 include ARP broadcast suppression operations and DHCP broadcast suppression operations, as described in U.S. Pat. No. 9,548,965. Other I/O operations (such as firewall operations, load-balancing operations, network address translation operations, etc.) can be so implemented in some embodiments of the invention. By implementing a stack of such function calls, the ports 160-165 can implement a chain of I/O operations on incoming and/or outgoing messages, in some embodiments. Also, in some embodiments, other modules in the data path (such as the VNICs 155 and the ports 160-165, etc.) implement the I/O function call operations instead of, or in conjunction with, the ports 160-165.

In some embodiments, one or more of function calls of the SFE ports 160-165 can be to service engines 115 that query context engine 110 for context information that service engines 115 use, in some embodiments, to generate context headers (e.g., headers including context data) that include context data used in providing a service at the service engines 115 and, in some embodiments, identify service rules applied to provide the service. Context data, in some embodiments, is stored by a component of a service engine 115 executing in a kernel space for retrieval by the flow exporter 170. In some embodiments, the generated context headers are then provided through one of the ports 160-165 of SFE 112 to flow exporter 170 (e.g., flow identifier and statistics collector 171). The generated context headers, in some embodiments, also include at least one of a first value based on a user ID (e.g., the user ID), and a second value based on a process hash and command line associated with the data message flow (sometimes referred to as a modified process hash or process instance identifier in this disclosure). In some embodiments, the at least one of the first and second values are included even when not used in providing the service. In other embodiments, at least one of the first and second values are provided upon receiving a request from a flow exporter 170.

Flow exporter 170 monitors flows, collects flow data and statistics, aggregates flow data into flow group records, and publishes flow group records for consumption by the analysis appliance. In some embodiments, flow exporter 170 generally aggregates statistics for individual flows identified during multiple time periods, and for each time period identifies multiple groups of flows with each group including one or more individual flows. For each identified group, flow exporter 170 identifies a set of attributes by aggregating one or more subsets of attributes of one or more individual flows in the group as described below in greater detail. In some embodiments, the subset of attributes of each individual flow in each group is the aggregated statistics of the individual flow. After the multiple time periods, flow exporter 170 provides the set of attributes for each group identified in the multiple time periods to a server (e.g., an analysis appliance) for further analysis of the data flows identified.

As shown, the flow exporter 170 includes flow identifier/statistics collector 171, flow identifier and statistics storage 172, flow collector timer 173, flow collector 174, first-in first-out (FIFO) storage 175, configuration data storage 176, flow aggregator 177, flow group record storage 178, flow publisher timer 179, and flow group record publisher 180 for collecting and processing flow data to produce aggregated flow group records and publishing the set of flow aggregated records.

Flow exporter 170 receives flow information, including flow identifiers and statistics, at flow identifier/statistics collector 171. In some embodiments, the received flow information is derived from individual data messages that make up the flow and includes context data used in making service decisions at service engines 115. In some embodiments, the flow exporter 170 receives the context data (i.e., the values based on the user ID and the process hash/command line associated with data message flows) generated by the context exporter 140 to append to data messages. In some embodiments, the flow exporter 170 stores the received information associated with particular flows in flow identifier and statistics storage 172. The statistics, in some embodiments, are summarized (accumulated) over the life of the particular flow (e.g., bytes exchanged, number of packets, start time, and duration of the flow).

Figure 3:
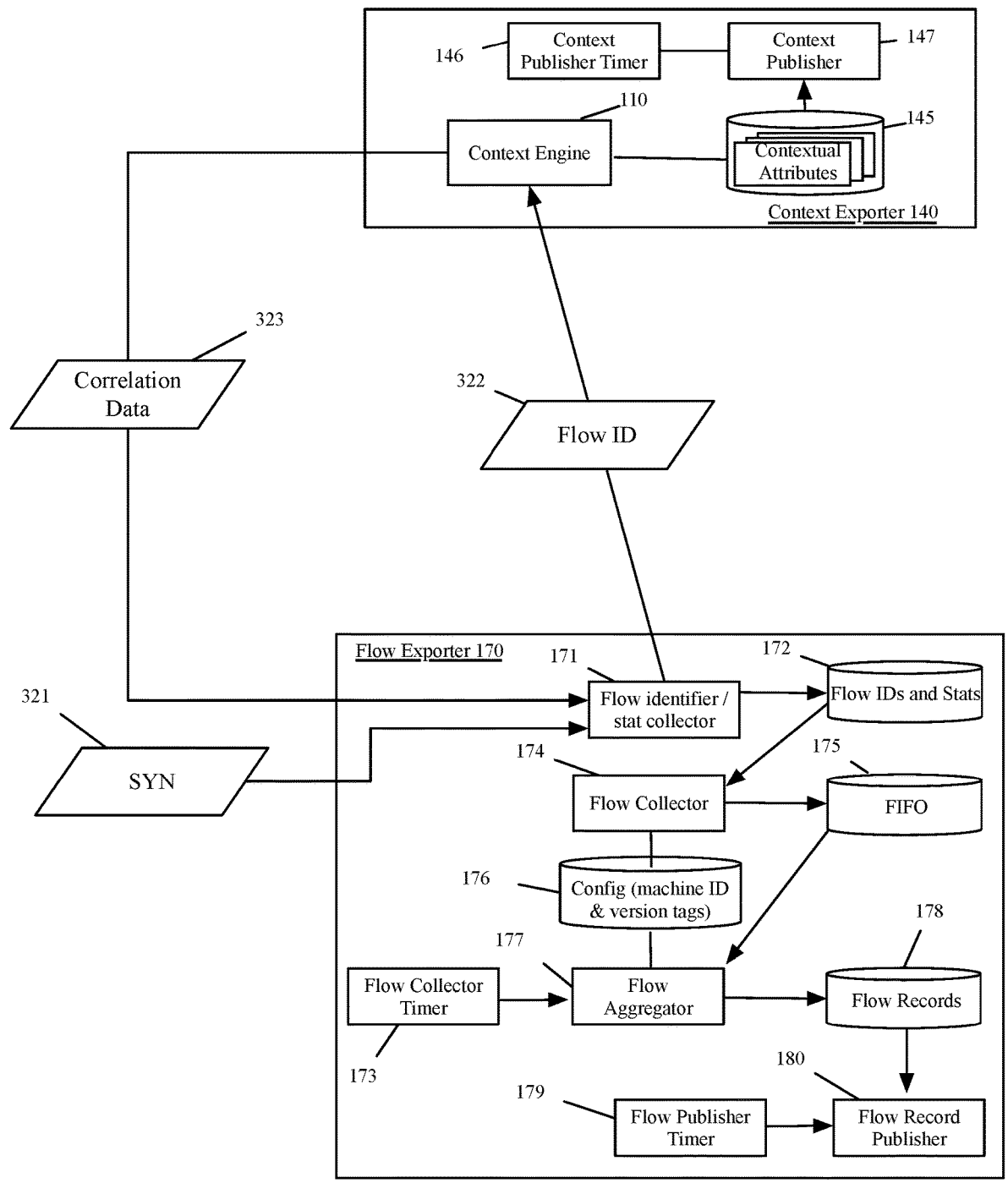
FIG. 3 illustrates an exemplary interaction between the flow exporter and the context engine for communicating a correlation data set.
Figure 4:
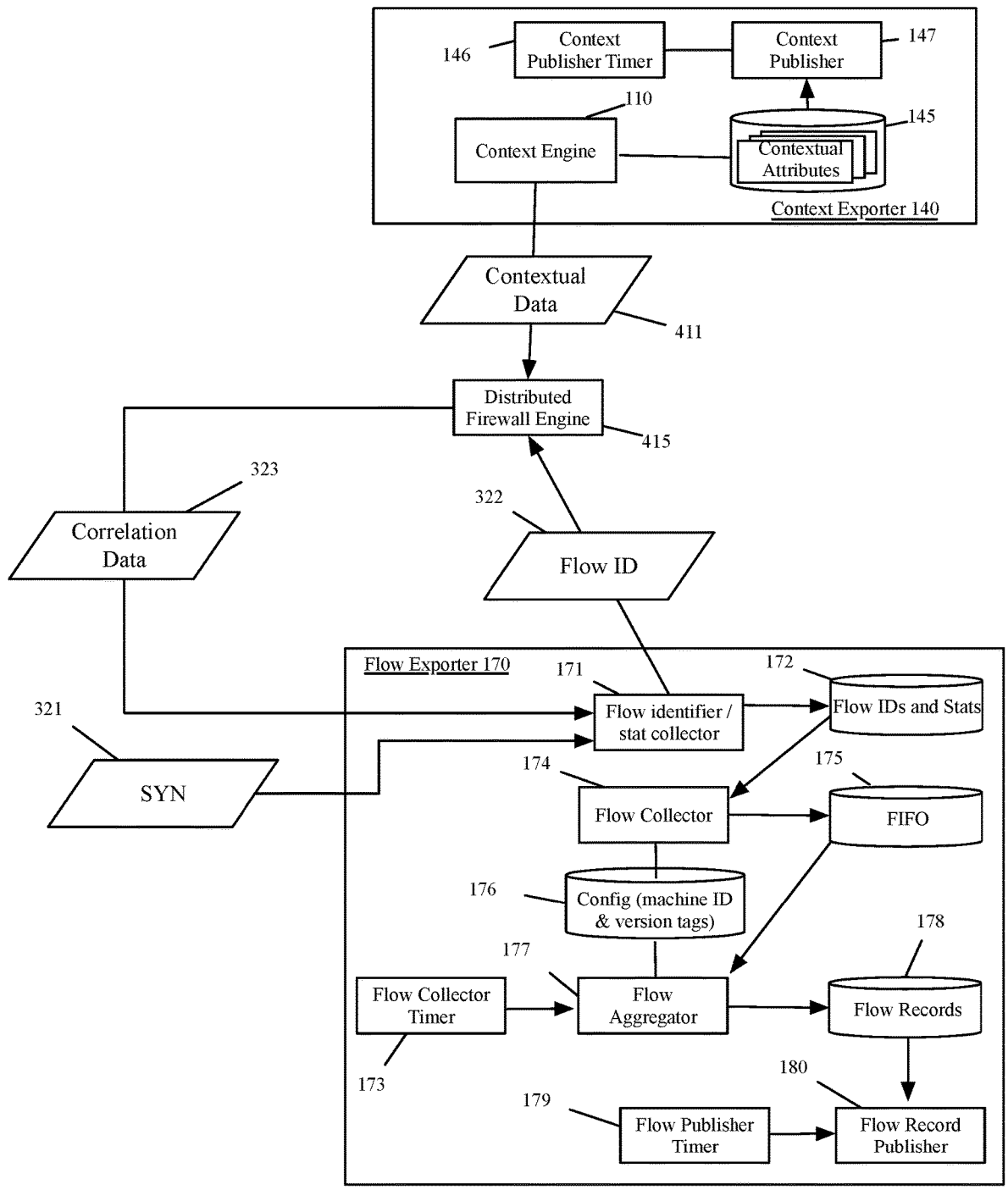
FIG. 4 illustrates an exemplary interaction between the flow exporter and a distributed firewall engine for communicating a correlation data set.
Figure 5:
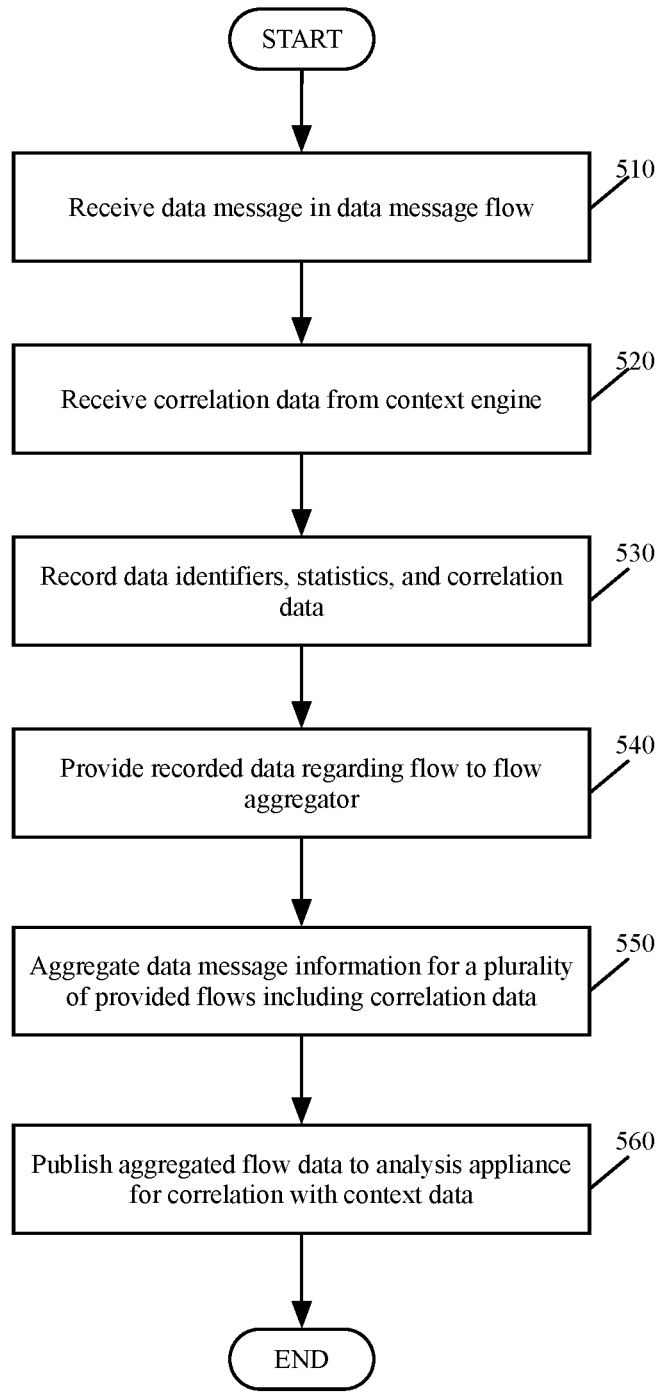
FIG. 5 conceptually illustrates a process for processing a received data message to be provided to an analysis appliance.

FIG. 5 conceptually illustrates a process 500 for processing a received data message to be provided to an analysis appliance. FIG. 5 will be described with reference to FIGS. 3 and 6A-D. FIG. 3 illustrates flow identifier/statistics collector 171 requesting a generated correlation data set for a particular received data message from context engine 110. Process 500, in some embodiments, is performed by flow exporter 170. Process 500 begins (at 510) by receiving a data message. In some embodiments, the received data message is a SYN data message that indicates that the data message is the first data message in a data message flow. For example, FIGS. 3 and 4 show flow exporter 170 receiving a SYN data message 321 at flow identifier/statistics collector 171 that is a first data message in a data message flow with a set of flow headers that identify the flow (e.g., are a flow ID).

After receiving (at 510) the data message (e.g., data message 321), the process 500 receives (at 520) correlation data (e.g., correlation data 323). In some embodiments, the correlation data 323 is received from context engine 110 (as in FIG. 3), while in other embodiments, the correlation data 323 is received from a service engine (e.g., distributed firewall engine 415 of FIG. 4) which in turn receives it as part of contextual data 411 from the context exporter 140 (e.g., the context engine 110 of context exporter 140). In some embodiments, the distributed firewall engine 415 includes a kernel module storing the correlation data 323 (e.g., among other contextual data) which it uses to provide a distributed firewall service. FIGS. 3 and 4 illustrate that, in some embodiments, the request 322 includes a flow ID. The flow ID is extracted from the received data message (e.g., data message 321) and is used by the context engine 110 (or distributed firewall engine 415), in some embodiments, to identify the correlation data 323 associated with the received data message (e.g., data message 321). In some embodiments, the correlation data 323 is sent from the context engine 110 (to either the flow exporter 170 or the distributed firewall engine 415) upon detecting a request for a new data message flow along with a flow ID that will allow the flow exporter 170 to associate the correlation data 323 with incoming data messages.

After receiving the data message (at 510) and the correlation data set (at 520), the process 500 records (at 530) the flow identifiers, statistics, and correlation data. In some embodiments, this recording is performed by flow identifier/statistics collector 171. After recording (at 530) the flow identifiers, statistics, and correlation data, the recorded data is provided (at 540) to a flow aggregator 177 of the flow exporter 170. Additional details of the operations between flow identifier/statistics collector 171 and flow aggregator 177 are discussed below and in U.S. patent application Ser. No. 16/554,370.

The process 500 then aggregates (at 550) the recorded data, including the correlation data set, into an aggregated set of flow data. Additional recorded data, in some embodiments, from previously and subsequently received data messages is aggregated into the aggregated set of flow data and the process 500 publishes (at 560) the aggregated flow data, including at least the correlation data set received (at 520) from the context engine, to the analysis appliance. The analysis appliance uses the correlation data included in the context data and the aggregated flow data to correlate the data sets as will be described below in relation to FIGS. 8-13.

Returning to the description of FIG. 1, flow collector 174, in some embodiments, monitors the flows to determine which flows have terminated (e.g., timeouts, FIN packets, RST packets, etc.), collects the flow identifiers and statistics, and pushes the collected data to FIFO storage 175. In some embodiments, flow collector 174 collects additional configuration data from configuration data storage 176 and includes it with the data collected from flow identifier and statistics storage 172 before sending the data to FIFO storage 175.

Additionally, the flow collector 174, in some embodiments, collects data for long-lived active flows (e.g., flows lasting longer than half a publishing period) from flow identifier and statistics storage 172 before the end of a publishing period provided by flow publisher timer 179. In some embodiments, the data collected for a long-lived active flow is different from the data collected for terminated flows. For example, active flows are reported using a start time, but without a duration in some embodiments. Only flows meeting certain criteria are collected by flow collector 174 in some embodiments. For example, only information for flows using a set of particular protocols (e.g., TCP, UDP, ESP, GRE, SCTP) are collected, while others are dropped or ignored. In some embodiments, additional types of traffic, such as broadcast and multicast, safety check (e.g., having ruleID=0 or 0 rx and tx byte/packet counts), L2 flows, flows which are not classified as one of (1) inactive, (2) drop, or (3) reject, are dropped (i.e., not collected or not placed into FIFO storage 175). The process for collecting data into flow identifier and statistics storage 172 and pulling it into FIFO storage 175 is described in more detail in U.S. patent application Ser. No. 16/554,370.

In some embodiments, FIFO storage 175 is a circular or ring buffer such that only a certain number of sets of flow identifiers and flow statistics can be stored before old sets are overwritten. In order to collect all the data placed into FIFO storage 175, or at least to not miss a significant amount (e.g., miss less than 5% of the data flows), flow aggregator 177 pulls data stored in FIFO storage 175 based on a flow collector timer 173 and aggregates the pulled data into aggregated flow group records ("buckets"). Some embodiments pull data from FIFO storage 175 based on a configurable periodicity (e.g., every 10 seconds), while other embodiments, alternatively or in addition to the periodic collection, dynamically determine when to collect data from FIFO storage 175 based on a detected number of data flows (e.g. terminated data flows, a total number of active data flows, etc.) and the size of FIFO storage 175. Each set of flow data pulled from FIFO storage 175 for a particular flow, in some embodiments, represents a unidirectional flow from a first endpoint (e.g., machine or DCN) to a second endpoint. If the first and second endpoints execute on the same host computer, in some embodiments, a same unidirectional flow is captured at different ports 160-165 of host 100. To avoid double counting a same data message provided to flow identifier 171 from the two ports 160-165, flow identifier 171 uses a sequence number or other unique identifier to determine if the data message has been accounted for in the statistics collected for the flow. Even if duplicate data messages for a single unidirectional flow have been accounted for, the flow aggregator 177 additionally, in some embodiments, combines sets of flow data received for the separate unidirectional flows into a single set of flow data. In some embodiments, this deduplication (deduping) of flow data occurs before further aggregation, while in other embodiments occurs after an aggregation operation.

Figure 6A:
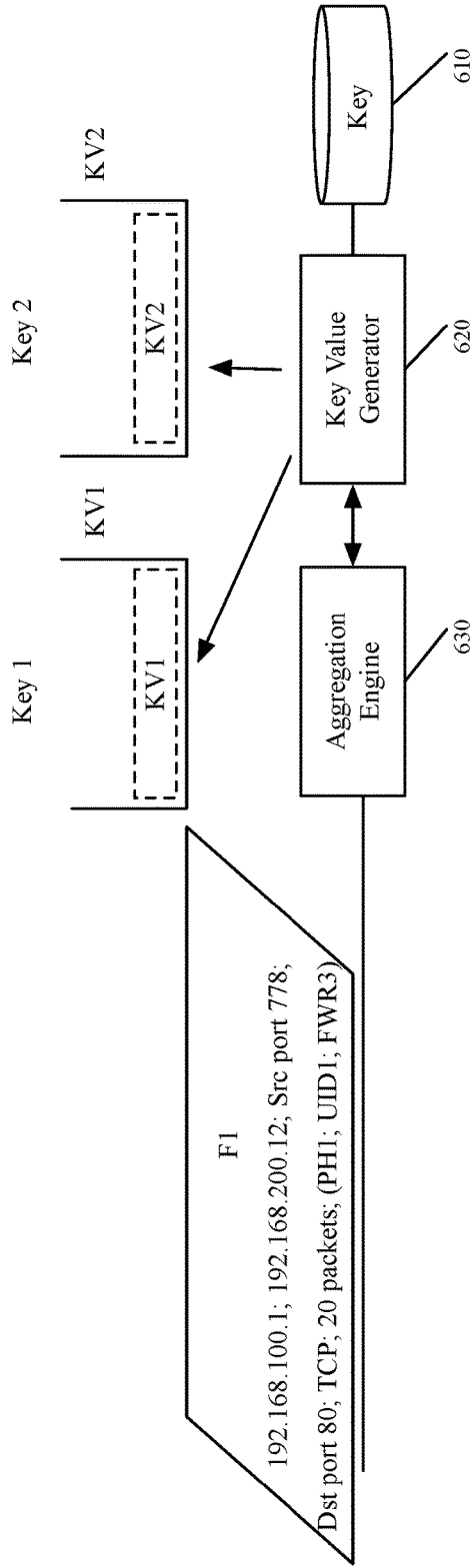
FIGS. 6A-6D illustrate components of an exemplary flow aggregator for aggregating particular flow data sets into particular aggregated flow group records.
Figure 6B:
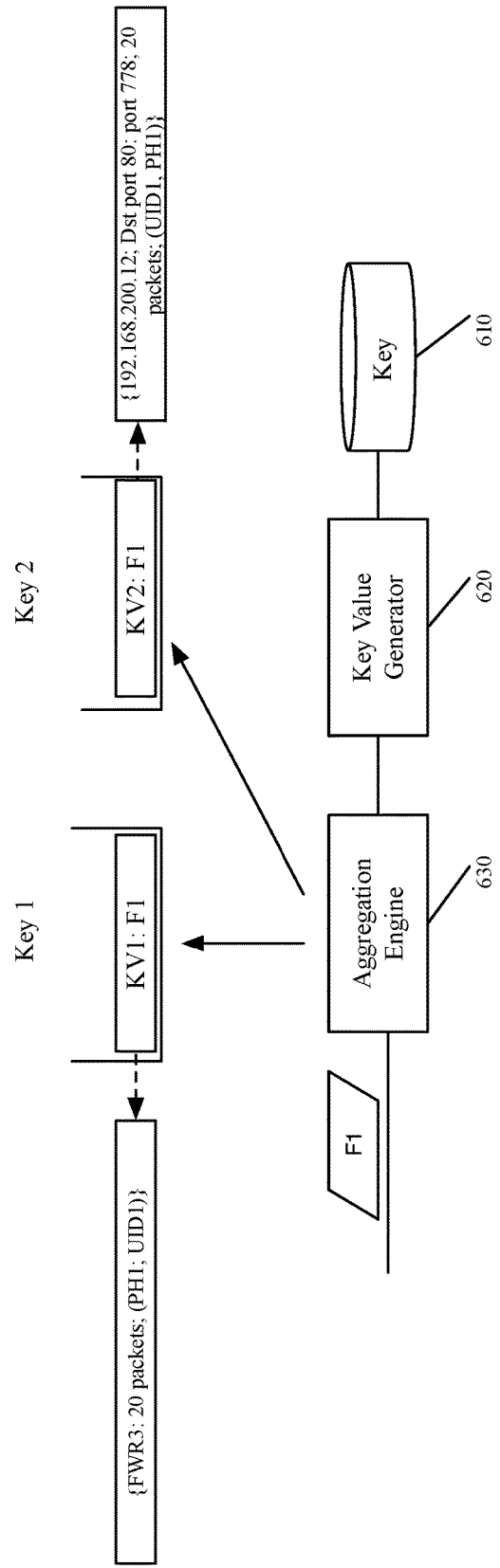

Flow aggregator 177, in some embodiments, receives a set of keys from the analysis appliance through the network manager computer (as described above) that specify how the flow data sets are aggregated. FIGS. 6A-6D illustrate components of an exemplary flow aggregator including a key storage 610 for storing the set of keys, a key value generator 620 for dynamically generating key values for particular aggregated flow group records based on incoming flow data sets, and an aggregation engine 630 for aggregating particular flow data sets into particular aggregated flow group records. FIG. 6A illustrates a set of two keys that generate two sets of aggregated records based on particular values for the two keys identified from flow data sets pulled from a FIFO storage. For example, a first key may specify a first set of fields in the flow data sets (e.g., a service rule identifier in a context header), while the second key may specify a second set of fields included in the flow data sets (e.g., a destination IP address and port number). Based on the keys, when a flow aggregator receives a first packet associated with a first flow, key value generator 620 generates key values KV1 and KV2 based on the values in the flow data set (e.g., {192.168.100.1; 192.168.200.12; Src port 778; Dst port 80; TCP; 20 packets; process hash 1 (PH1); user ID 1 (UID1); firewall rule 3 (FWR3)}) for the attributes specified by the two keys (e.g., KV1: {FWR3}, KV2: {192.168.200.12; Dst port 80}). In this example, keys also specify attributes for which data is collected and ignored. For space considerations, key 1 will ignore everything except the number of packets exchanged and correlation data (e.g., user ID and process ID (process hash) pairs) and key 2 will ignore everything except the source port, the number of packets, and the correlation data. FIG. 6B illustrates that after the key values are generated, aggregation engine 630 puts the attributes from the first packet into the flow group records for the different key values for the first and second keys along with the correlation keys.

Figure 6C:
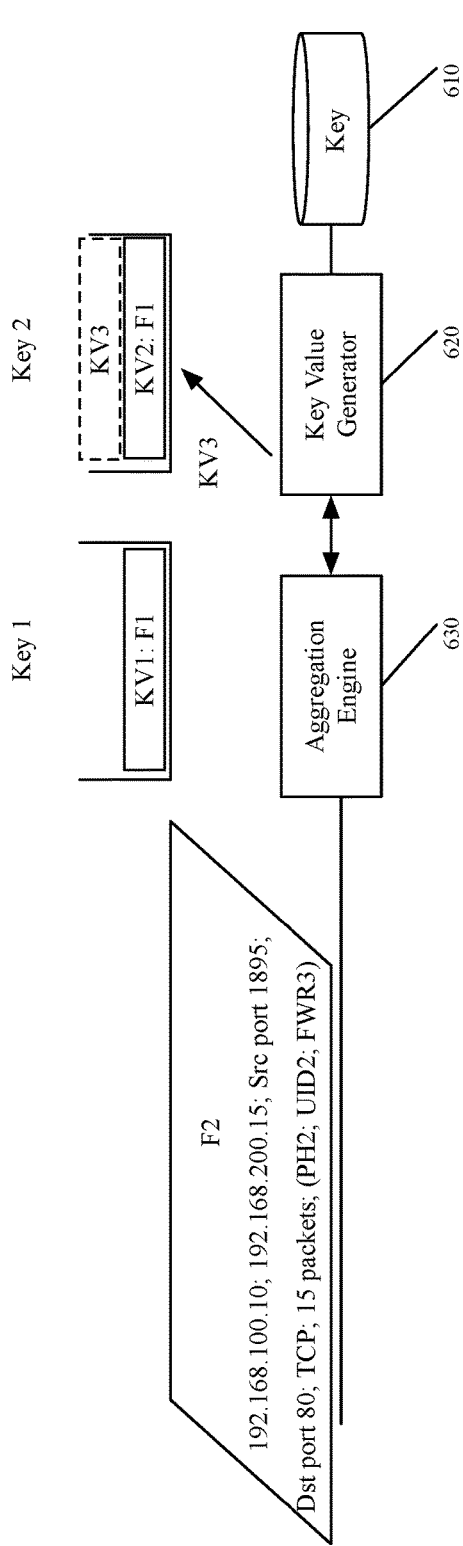

FIG. 6C illustrates a second set of flow data for a second flow being received (i.e., flow 2 [F2] having values {192.168.100.10; 192.168.200.15; Src port 1895; Dst port 80; TCP; 15 packets; PH2; UID2; FWR3}). Key value generator 620 determines that the key values of the second flow for key 1 are the same as those of the first flow and does not generate a second flow group record for key 1, and further determines that the destination IP address of the second flow is different from the destination IP address of the first flow and generates a new key value for key 2 (i.e., KV3: {192.168.200.15; Dst port 80}).

Figure 6D:
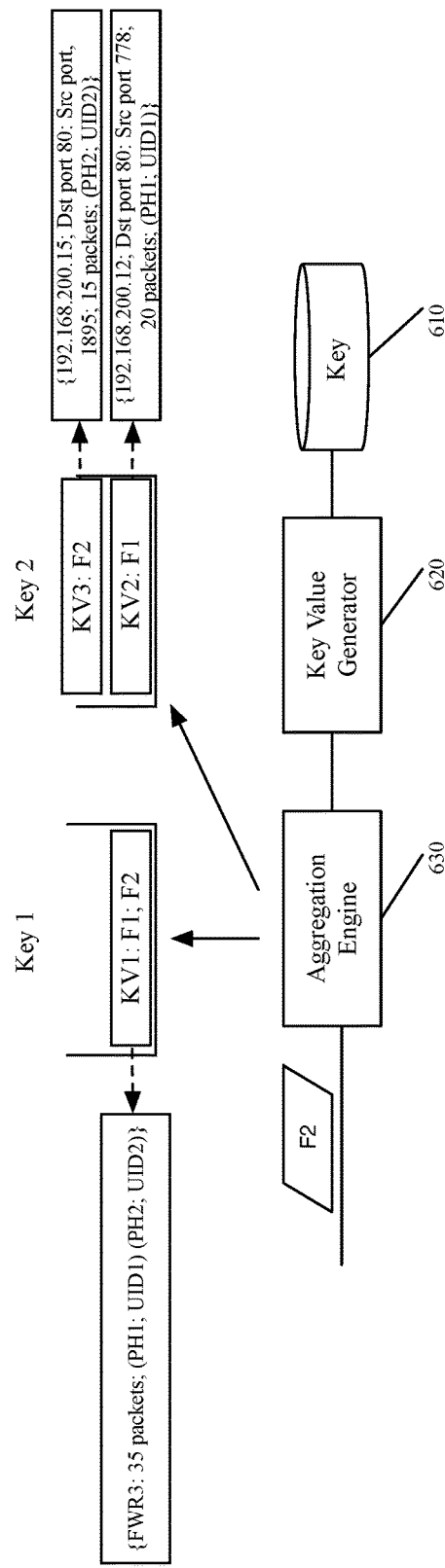

FIG. 6D illustrates aggregation engine 630 placing the information from the second set of flow data (Src port 1895; 15 packets; (PH2; UID2)) into the newly generated record for key value 3 (KV3) and aggregating the information from the second set of flow data (e.g., 15 packets) into the previously created record for key value 1 (KV1) for the first key (to result in a aggregated flow group record {FWR3: 35 packets, (PH1; UID1) (PH2; UID2)}). The record for KV1 now has information for the first and second sets of flow data. In some embodiments, the flow data for each attribute (e.g., source IP address, source port, destination IP address, destination port, protocol, flow start, flow duration, bytes, packets, SID, process hash, machine ID, version tag, service rules hit, etc.) included in the sets of flow data is concatenated, in other embodiments, only unique attribute values are added to the record for the key value, or some combination of the two methods for aggregating data is used in conjunction with other methods that are appropriate for different attributes (e.g., keeping only an earliest start time or accumulating duration, number of bytes exchanged, and number of packets exchanged for all aggregated flows). Additional details regarding the flow exporter 170 can be found in U.S. patent application Ser. No. 16/554,370.

Some embodiments provide an analysis appliance that receives the collected data (e.g., as separate flow group records and contextual attribute data) from the hosts, as well as configuration data from a network manager computer. The analysis appliance, in some embodiments, is a server (or cluster of servers) that based on the received reports from each host computer and configuration data from the network manager computer, processes the data to be stored in a time-series-data storage, and performs analysis on the stored data. In some embodiments, the analysis appliance also provides access to the stored data to additional elements of the system for visualization and alternative analysis.

Figure 7:
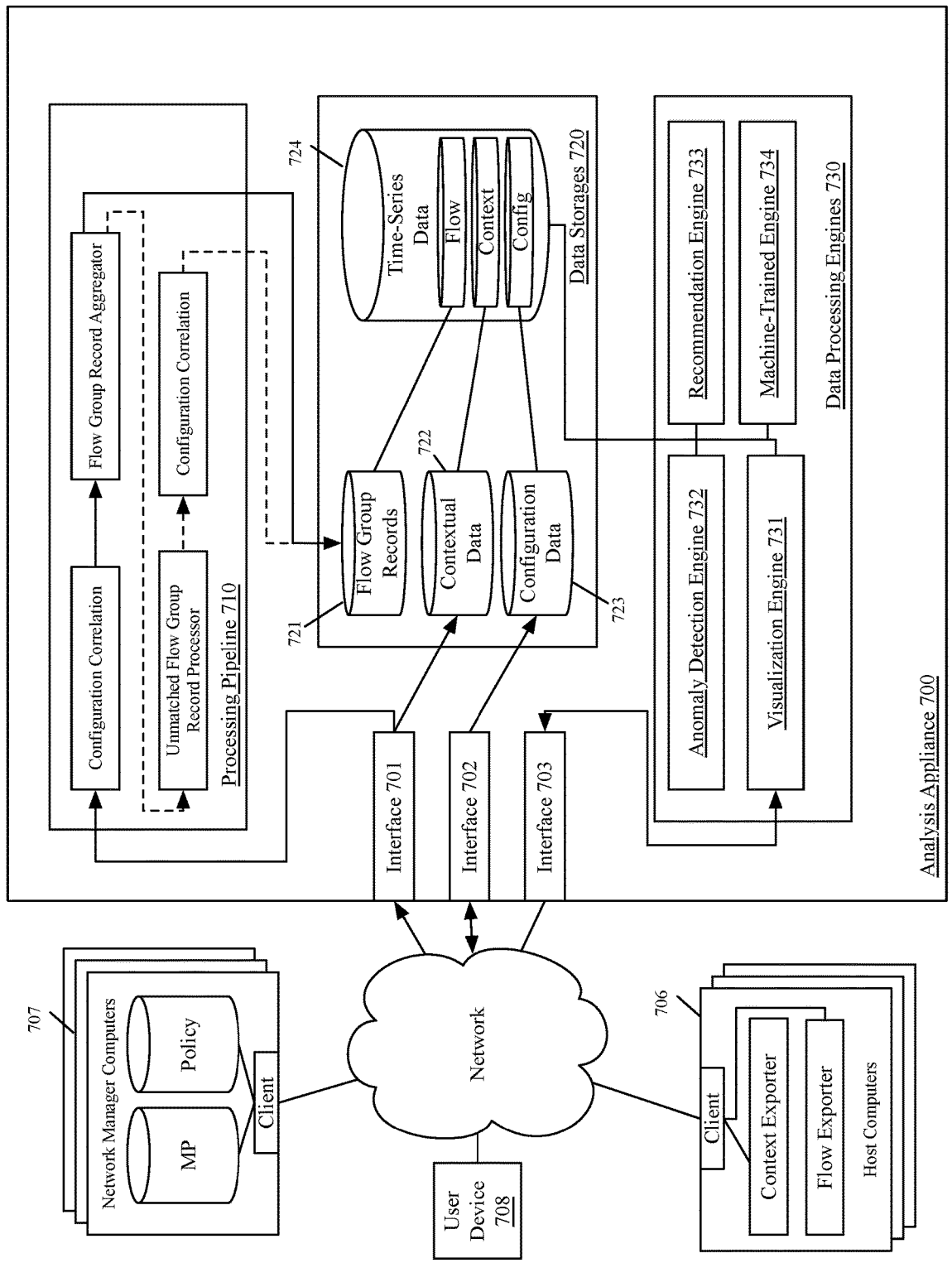
FIG. 7 illustrates an exemplary analysis appliance.

FIG. 7 illustrates an exemplary analysis appliance 700. Analysis appliance 700, in some embodiments, provides a set of interfaces 701-03 for receiving data from a set of host computers 706 and a set of network manager computers 707 and for interacting with a user through a user interface 708, respectively. The analysis appliance 700 also includes, in some embodiments, a processing pipeline 710 for flow data (e.g., flow group records received from host computers), a set of data storages 720 for storing received data, and a set of data processing engines 730 (e.g., a visualization engine 731, an anomaly detection engine 732, a recommendation [generation] engine 733, and a machine-trained engine[/network] 734).

Interfaces 701-03, in some embodiments, are separate interfaces (e.g., ports, IP addresses, etc.) for interacting with the host computers 706, network manager computers 707, and user interfaces 708. In some embodiments, interfaces 701-03 are combined into a single interface through which the different elements of the system interact with the appliance. Interface 701, in some embodiments, is used to receive both flow data and context data from the host computers 706. In some embodiments, interface 701 is not used by the analysis appliance 700 for communicating to the host computers 706. Instead, in some embodiments, the analysis appliance 700 communicates control messages (e.g., updates to service rule policies, updated keys, updated group memberships validated by a user, etc.) through network manager computers 707. Interface 702 receives configuration data from the network manager 707, in some embodiments. Interface 702, in some embodiments, is used to receive both management plane configuration data and policy configuration data. In some embodiments, interface 702 is also used to communicate with the hosts 706 through the network management computer 707. Interface 703, in some embodiments, is used to receive key definitions, and commands for the visualization engine 731 received from a user (e.g., through the GUI). Processing pipeline 710, in some embodiments, processes flow data (e.g., flow group records) received from the host computers 706 in the system for analysis by other elements of the analysis appliance 700.

Returning to the discussion of FIG. 7, the data storages 720 include, in some embodiments, a data storage for each different type of data received (e.g., a correlated flow group record data storage 721, a contextual attribute data storage 722, a configuration data storage 723, and a time-series-data storage 724). The contextual attribute data storage 722, in some embodiments, stores received contextual attribute data from multiple host computers and uses that data for populating the time-series-data storage 724 with contextual attribute data (e.g., in a contextual attribute topic). In some embodiments, the contextual attribute data storage 722 is used in correlating contextual attributes with flow group records for display. The time-series-data storage 724 is used additionally, or alternatively, in other embodiments, for correlating contextual attribute data to flow group record data.

The contextual attribute data storage 722, in some embodiments, receives contextual attribute data sets including any, or all, of: data regarding guest metadata, guest events, and guest DCN metrics. In some embodiments, the guest metadata includes any or all of DCN details (a universally unique identifier [UUID], a bios uuid, and a vmxpath), operating system details (type of OS and version information), and process details (e.g., process ID, creation time, hash, name, command line, security ID [SID], user ID [UID], loaded library or module information, process metrics [e.g., memory usage and CPU usage], process version, parent process ID, etc.). Guest events, in some embodiments, include DCN events (e.g., power on and power off), user login events (e.g., login, logoff, connect, and disconnect events, a session ID, a timestamp, a DCN IP, and a connected client IP), and service process events (e.g., event type [e.g., listen start, listen stop], timestamp, destination DCN IP, destination port number, and process details). Guest DCN metrics, in some embodiments, include memory usage and CPU usage. One of ordinary skill in the art will appreciate that many additional pieces of information may be provided to a contextual attribute data storage and that the partial list above serves only as an example.

In some embodiments, the set of data storages 720 includes a correlated flow group record data storage 721. The correlated flow group record data storage 721, in some embodiments, stores flow group records after aggregation and correlation with configuration data stored in a configuration data storage 723. The correlated flow group record data storage 721, in some embodiments, also stores learned pairings of IP addresses and machine identifiers. In some embodiments, the learning is based on previously processed flow record groups. The correlated flow group record data storage 721, in some embodiments, provides processed (e.g., aggregated and correlated) flow group records to the time-series-data storage.

The configuration data storage 723, in some embodiments, receives configuration data from a network manager controller. In some embodiments, the configuration data includes configuration data sets sent from a management plane (MP) configuration storage and a policy configuration storage on a network manager computer 707 that are merged before or after being sent from the network manager computer 707. The management plane configuration data sets include information relating to group membership (in terms of machines), and the policy configuration data sets include information about service rules (e.g., firewall rules), in some embodiments. The service rules, in some embodiments, are expressed in terms of any of IP addresses, ports, protocols, groups, etc., in any combination. In some embodiments, an initial set of configuration data is sent at startup or reboot of either the network manager computer or the analysis appliance, while subsequent configuration data sets include only changes to the last configuration data set.

The time-series-data storage 724, in some embodiments, stores flow group records, configuration data, and context data. In some embodiments, the time-series-data storage 724 is organized by topic with each different type of data stored in a different topic. Additionally, in some embodiments, each topic is organized in a time-series fashion by use of an index that is appended to each set of data and is coordinated among all the producers of data for the topic. The time-series-data storage 724 is organized at a plurality of levels of temporal granularity, in some embodiments. In some embodiments, the different levels of granularity include some combination of hourly, daily, weekly, and monthly. The different levels of temporal granularity are used, in some embodiments, for data collected for a previous 24 hours (e.g., organized on an hourly basis), data for a previous 6 days (e.g., organized on a daily basis), data for a previous 70 days (e.g., organized on a daily or weekly basis), and data received more than 30 days earlier (e.g., organized on a monthly basis). The data organized based on the various levels of temporal granularity are, in some embodiments, periodically (e.g., daily) rolled up into the next level of granularity.

Figure 8:
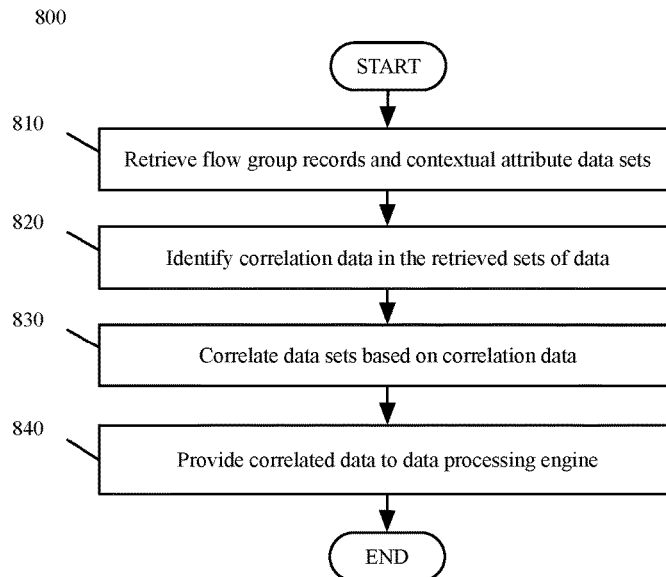
FIG. 8 conceptually illustrates a process for correlating contextual attribute data sets with flow group records.

Some embodiments provide contextual attribute data correlation that is used in multiple analysis engines discussed below. FIG. 8 conceptually illustrates process 800 for correlating contextual attribute data sets with flow group records. Process 800 is performed, in some embodiments, by each analysis engine to correlate and collect relevant attributes, while in other embodiments a shared correlation engine is used by each analysis engine. Process 800 begins by retrieving (at 810) the flow group records and contextual data attribute sets for correlation. In some embodiments, the data is retrieved from at least one of (1) a contextual attribute data storage and a correlated flow group record data storage (e.g., correlated with configuration data) and (2) a time-series-data storage (storing both flow group records and contextual attribute data sets).

After retrieving (at 810) the data sets for correlation, the process 800 identifies (at 820) correlation data sets in the stored flow data and context data. In some embodiments, the correlation data includes a combination of at least one of a user ID, a process hash, and a process instance identifier. Some embodiments using a process instance identifier, derive a process instance identifier for context data based on a process hash and CLI parameter stored in the context data. The context data and flow data are then correlated (at 830) based on the identified correlation data sets in the flow and context data. In some embodiments, the correlation includes merging the context and flow data records sharing a same correlation data set (i.e., a correlation data set having the same values) into a single correlated record. In some embodiments, the correlation includes adding selected (e.g., configurable) attributes from the contextual attribute data set to the flow group records. One of ordinary skill in the art will understand that the ultimate form of the correlated records, in some embodiments, depends on the purpose of the correlated records (e.g., a first data processing engine will request data in a certain format, while another processing engine will request data in a different format).

The correlation operation, in some embodiments, includes a disambiguation operation if multiple flow group records and contextual attribute data sets include a same set of values in their correlation data sets. The disambiguation is performed, in some embodiments, using the flow data and contextual data included in the correlated data sets. In other embodiments, the contextual attribute data sets and flow data records are aggregated based on corresponding attributes such that there is an unambiguous relationship between contextual attribute data sets and flow data records. For example, if contextual attribute data sets are generated for every flow, then every flow data record that includes flow data for a particular flow will be correlated with the contextual attribute data set associated with the particular flow. In some embodiments, each record in the different sets of data is tagged by an index to ease future analysis operations that require correlated data. In other embodiments, the correlation is performed each time an analysis operation is performed because the analysis is generally performed only once per related data sets (e.g., data sets associated with a single time period in the time-series-data storage 724).

The correlated data is then provided (at 840) to a set of data processing engines (e.g., processing engines 731-34 in the set of data processing engines 730). The correlated data, in some embodiments, only includes a requested/selected portion of the correlated flow data and context data records (e.g., a selected set of header fields (at L2 and L3) and context data (at L7)). The correlated data, in some embodiments, allows a user to identify particular client-server communications based on the context data (e.g., context data regarding L7 parameters, such as a CLI parameter) and the flow data (e.g., a source/destination port used in flows associated with the client-server communication) received from the hosts of the client and server.

The correlated data, for some data processing engines, is provided based on a request from the data processing engine. For example, a process running periodically, requests correlated data relating to specific time periods at particular intervals. For other data processing engines, the correlated data is provided automatically or based on a user request. For example, if a user query regarding all activity by a set of users associated with a user ID, or a set of processes with a set of process hashes is received, a correlation operation occurs and the correlated data is sent to a visualization engine (e.g., 731) to be presented to the user as the result of the query. Different correlation operations and correlated data sets provided to data processing engines are illustrated in FIGS. 10-13.

The process 800, in some embodiments, is initiated by a user request for information relating to a set of particular processes, users, process/command line combinations, or any other context or flow attributes collected by the analysis appliance as would be understood by one of ordinary skill in the art. In other embodiments, the process 800 is performed periodically to provide correlated data to a set of analysis engines described below and in more detail in U.S. patent application Ser. No. 16/554,370.

Figure 9:
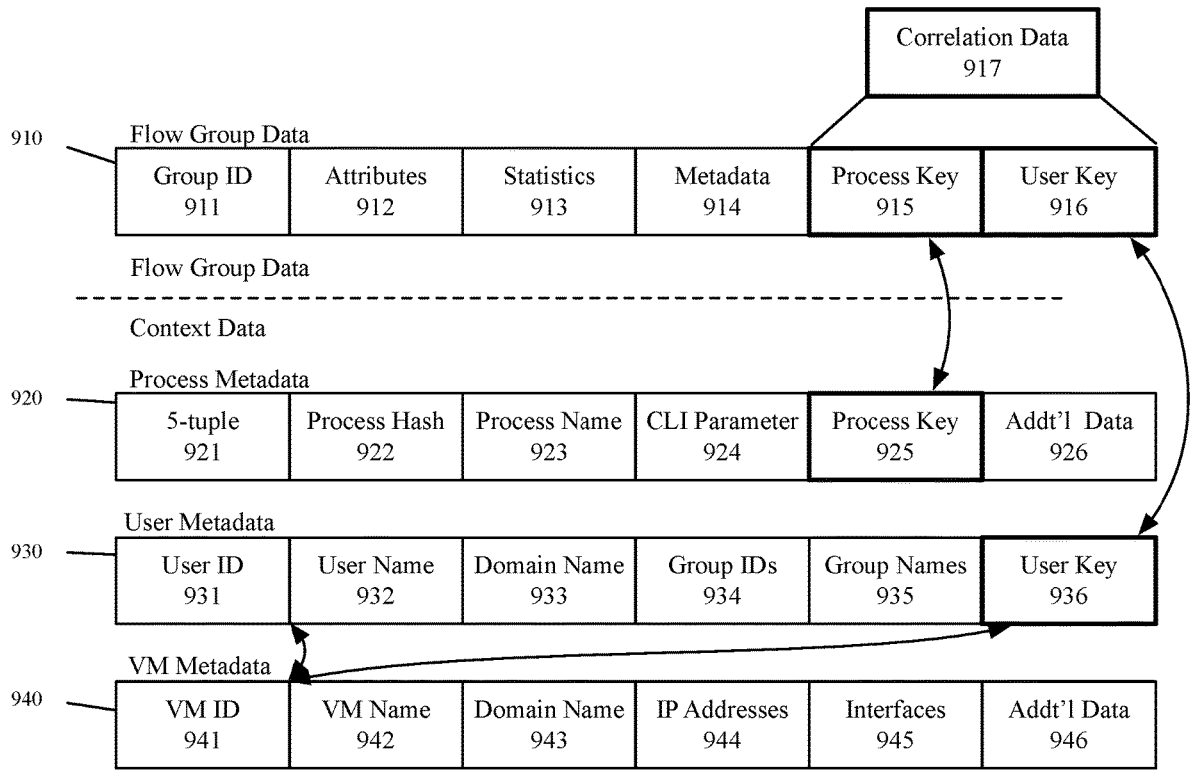
FIG. 9 illustrates a set of flow group data and sets of context data including correlation data used to correlate the set of flow group data and the sets of context data.

FIG. 9 illustrates a set of flow group data 910 and sets of context data 920-940 including correlation data used to correlate the set of flow group data 910 and the sets of context data 920-940. Flow group data 910 includes a flow group ID field 911, a set of flow attribute fields 912, a set of flow statistics fields 913, a set of flow metadata fields 914, and a set of correlation data fields 917 (including a process key field 915 and a user key field 916). The sets of context data 920-940 include a set of process metadata 920, a set of user metadata 930, and a set of VM metadata 940. FIG. 9 illustrates a non-exhaustive set of fields that may be included in the different sets of data. The flow group ID field 911, in some embodiments, includes a flow group ID (e.g., a number assigned at flow group creation, or a hash of header values or other values associated with the flow group) assigned or generated by another component of the system. The set of flow group attribute fields 912, in some embodiments, includes any or all of a set of header values associated with the aggregated flow data including source and destination IP (i.e., layer 3) addresses, a source and destination MAC (i.e., layer 2) addresses, source and destination ports, and protocols. For sets of flow data that aggregate multiple flows with at least one different header value, the set of aggregated header values may include only header values that are shared by individual flows aggregated into the set of aggregated flow data, or may include multiple different header values corresponding to each different flow aggregated into the set of flow data.

The set of flow statistics fields 913, in some embodiments, includes a flow start time, a flow end time, a flow duration, a number of bytes exchanged during the lifetime of the flow, a number of packets exchanged during the lifetime of the flow, or any other statistics of interest to a user. The set of flow metadata fields 914 includes, in some embodiments, information regarding a configuration version used (e.g., a version tag), a service rule applied to the data messages of the flow, a process ID associated with the flow, a VM ID associated with a flow, and a user ID associated with the flow (e.g., a Linux™ user ID, or SID). For flow group records that aggregate multiple distinct flows, the sets of statistics and flow metadata, in some embodiments, include single values for each field, while in other embodiments, each field includes a value or set of values based on multiple flows (e.g., an average value, or a concatenated set of values) based on an administrator's configuration of the aggregation method for the flow group data (i.e., a specification of the flow group record or "bucket").

The set of correlation data fields 917 stores the correlation data (i.e., in this embodiment, a process key 915 and a user key 916). As shown, the process key 915 and the user key 916 are, respectively, used to identify corresponding sets of user metadata 930 and process metadata 920. In some embodiments, the process key 915 is any of a process hash, a modified process hash, or process instance identifier (identifying a process and CLI parameter), and the user key 916 is any UUID (e.g., a Windows™ SID, a modified Linux™ UID, etc.). Additional correlation data may be included in correlation data 917 to correlate the context and flow data sets according to the requirements of the system or an administrator. One of ordinary skill in the art will understand that the separation of fields in the flow data does not place any restrictions on the arrangement of the different fields and that the flow data, in some embodiments, is merely a set of data arranged to include all desired information in a particular format that is established by a user.

The sets of context data 920-940, in some embodiments, include a set of process metadata 920, a set of user metadata 930, and a set of VM metadata 940. The set of process metadata 920 includes, in some embodiments, any or all of an n-tuple 921 (e.g., a 5-tuple) of a flow associated with the process, a process hash 922, a process name 923, a CLI parameter 924, a process key 925 (e.g., a modified process hash or process instance identifier), and any other process metadata 926 desired by an administrator that can be collected at the host computer. The process keys 915 and 925 stored in the flow group data 910 and process metadata 920, respectively, are shown as being used to correlate the set of flow group data 910 (i.e., a flow group record) and the process metadata 920. The set of user metadata fields 930 includes, in some embodiments, any or all of a user ID (e.g., a Linux™ UID) 931, a user name 932, a domain name 933, a group ID 934, a group name 935, a user key 936 (e.g., a UUID), and any other user metadata (not shown) desired by an administrator that can be collected at the host computer. As shown, the user keys 916 and 936 included in correlation data 917 and user metadata 930, respectively, are used to correlate the set of flow group data 910 to the user metadata 930.

The set of VM (or DCN) metadata 940 includes any or all of a VM identifier (VM ID) 941, a VM name 942, a domain name 943 of a domain to which the VM belongs, a set of IP addresses 944 associated with the VM, a set of interfaces 945 associated with the VM, and any other VM metadata 946 desired by an administrator that can be collected at the host computer. As shown, the flow group data 910 does not include correlation data in the set of correlation data fields 917 to correlate the flow group data 910 directly to the VM metadata 940, but, in some embodiments, information (e.g., a user key 936 and user ID 931) stored in the user metadata 930 (or in the process data 920) is used to correlate the VM metadata 940 with the user metadata 930 and, in turn, with the flow group data 910. For example, a user key 936, in some embodiments, is a VM VC UUID generated by appending a user ID corresponding to user ID 931 to a VM ID corresponding to VM ID 941, and by removing the user ID 931 from the user key 936, the remaining portion of the user key 936 can be, and is, correlated to the VM ID 941. In other embodiments, other information stored in the flow group data 910 is used to correlate flow group data 910 with VM metadata 940. For example, flow group metadata 914, in some embodiments, includes at least one VM ID associated with at least one flow aggregated into the flow group data 910, the VM ID can be used to correlate the flow group data 910 with at least one set of VM metadata 940. One of ordinary skill in the art will appreciate that the sets of context data 920-940, in some embodiments, are sent as a single set of context data by a context exporter, while in other embodiments, the context data sets 920-940 are sent to an analysis appliance as different context data sets (as shown).

Figure 10:
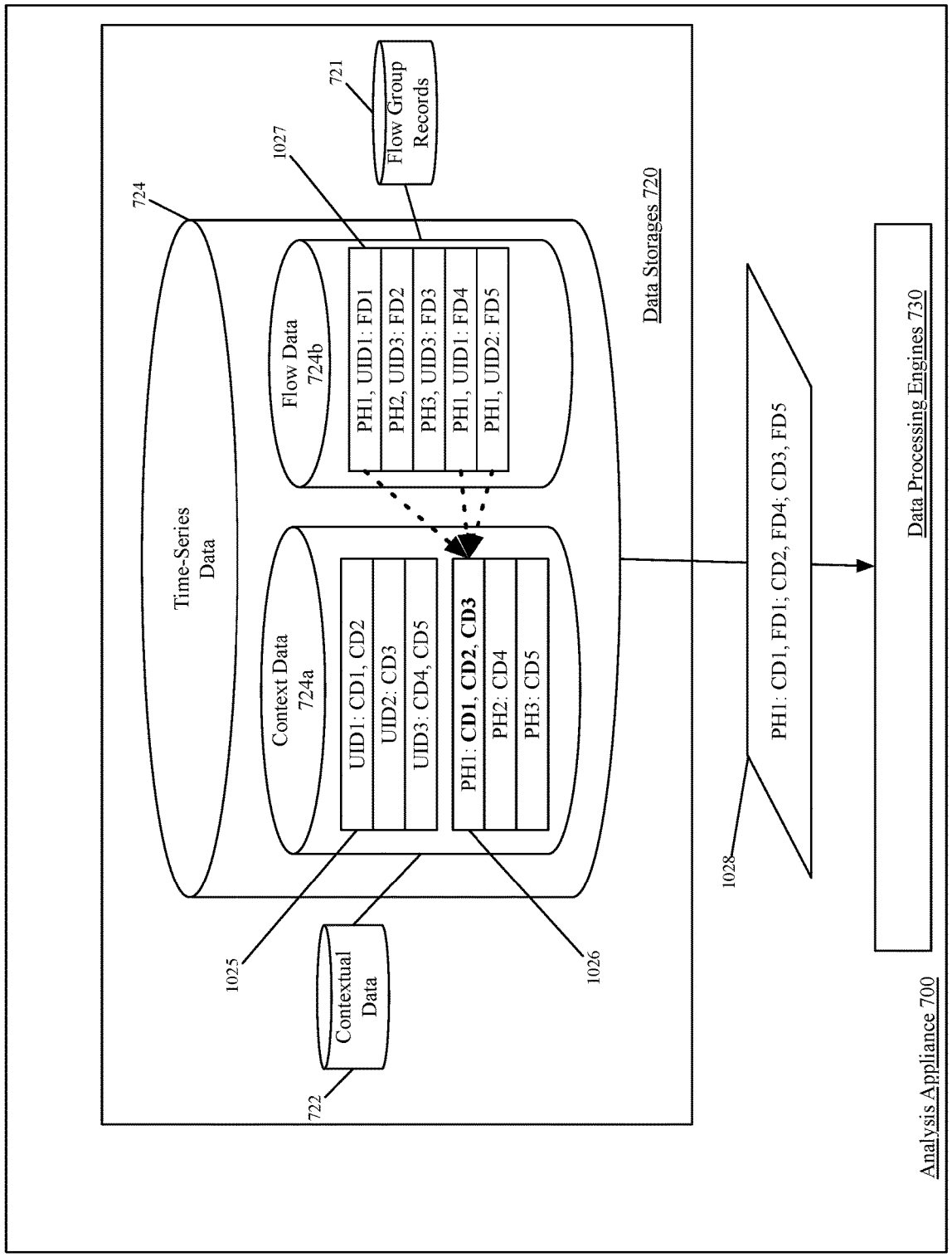
FIG. 10 illustrates a set of related records for correlation in a context data database and a flow data database.

FIGS. 10-13 illustrate a simplified view of analysis appliance 700, including different ways data may be stored in time-series-data storage 724 and different correlation and output operations. FIG. 10 illustrates a time-series-data storage including a context data storage 724*a* and a flow data storage 724*b*. In the below discussion, one of ordinary skill in the art will understand that although the discussion uses the terms "user ID" and "process hash" they are, in most instances, used generically to denote a user key and process key that may include any information used as correlation data specified by an administrator (e.g., a UUID [e.g., SID or VM VC UUID] and a process hash or process instance identifier). The context data storage 724*a* stores a user ID-indexed table 1025 and a process hash-indexed table 1026 that store different context data sets associated with different user IDs and process hashes, respectively. Flow data storage 724*b* stores a flow-data table 1027 for storing flow data records tagged with the correlation key (i.e., a set of correlation data including a UID and process hash pair) in the illustrated embodiment.

FIG. 10 illustrates a correlation based on a particular process hash "PH1" with three flow data records associated with the process hash "PH1" being correlated with the three sets of context data "CD1," "CD2," and "CD3" in the process-hash-indexed table 1026. Additional information in the context data and the flow data is used, in this embodiment, as part of a disambiguation operation to associate the individual flow data records with specific contextual attribute sets in the context data. The correlated data 1028, in this case, is sent to a set of data processing engines in the group of data processing engines 730 as a record for PH1 indicating flow record/contextual attribute set pairs for related records. Additional correlated records for each process hash in process-hash-indexed table 1026, in some embodiments, are sent to the data processing engines 730. In some embodiments, a single flow record is associated with multiple contextual attribute sets. Additionally, or alternatively, a single contextual attribute set, in some embodiments, is associated with multiple flow records.

Figure 11:
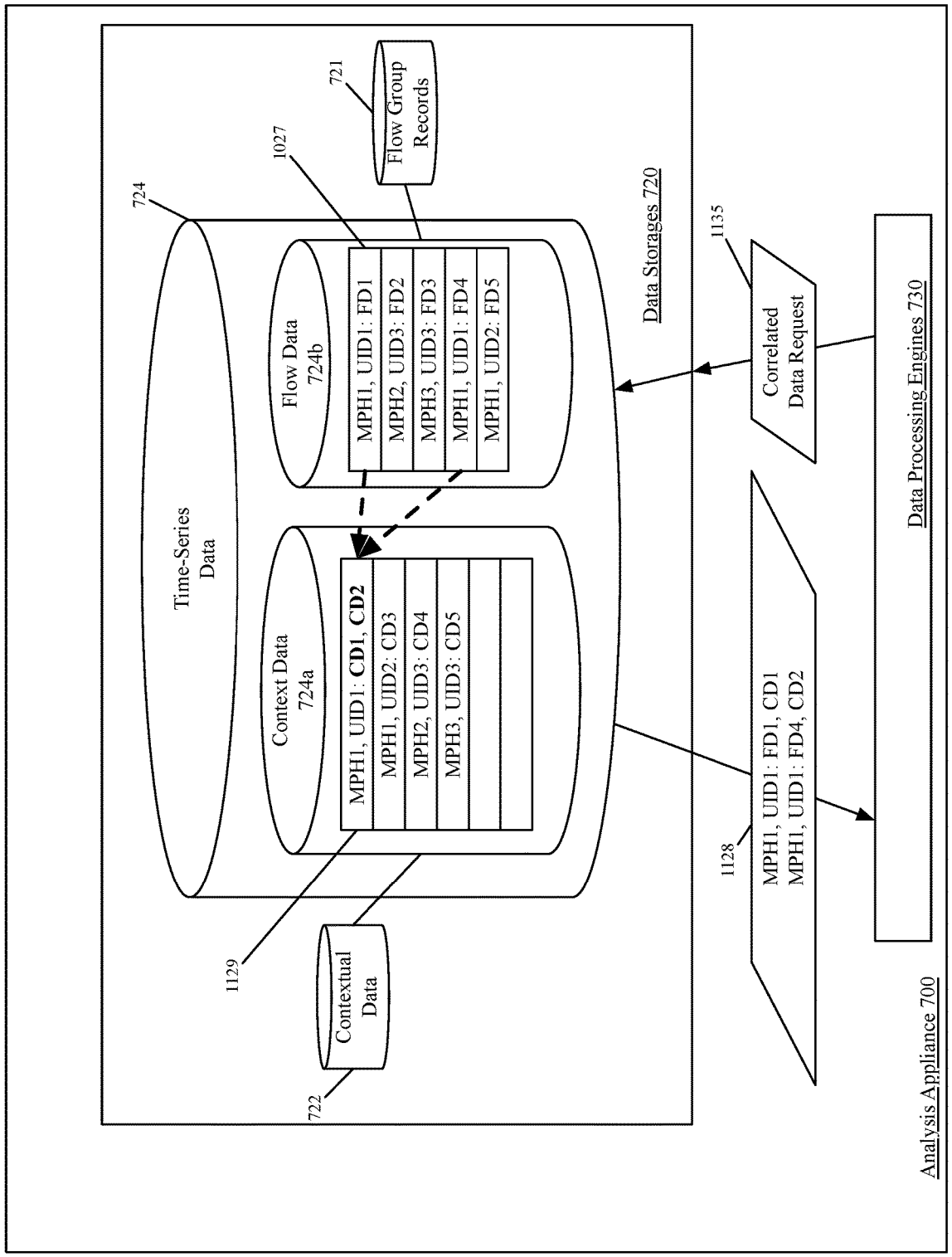
FIG. 11 illustrates a correlation based on a particular process hash/User ID pairing being requested by a data processing engine in a set of data processing engines.

FIG. 11 illustrates a correlation based on a particular modified process hash (MPH)/User ID (UID) pairing being requested by a data processing engine in the set of data processing engines 730. FIG. 11 illustrates a time-series-data storage 724, including a context data storage 724*a* and a flow data storage 724*b*. The context data storage 724*a* stores a modified process hash/User ID-pairing indexed table 1129 that stores different context data sets associated with unique modified process hash/User ID pairs. Flow data storage 724*b* stores a flow-data table 1027 for storing flow data records tagged with the correlation data set in the illustrated embodiment (i.e., a modified process hash/User ID pair).

FIG. 11 illustrates that a modified process hash/User ID pair is used to identify flow data and context data associated with a same modified process hash/User ID pair in response to correlated data request 1135. In some embodiments, the request 1135 specifies the format of the information provided as correlated data 1128. The requested format, in some embodiments, drives the method of correlation, as would be understood by one of ordinary skill in the art. As in the example of FIG. 10, a disambiguation operation uses additional information in the context data and the flow data, in this embodiment, to associate the individual flow data records with specific contextual attribute sets in the context data. The correlated data 1128, in this case, is sent to a set of data processing engines in the group of data processing engines 730 as a record for each correlated flow record and context data set along with the modified process hash/User ID pair. Additional correlated records for each modified process hash/User ID pair in modified process hash/User ID pair-indexed table 1129, in some embodiments, are sent to the data processing engines 730. In some embodiments, a single flow record is associated with multiple contextual attribute sets. Additionally, or alternatively, a single contextual attribute set, in some embodiments, is associated with multiple flow records.

Figure 12:
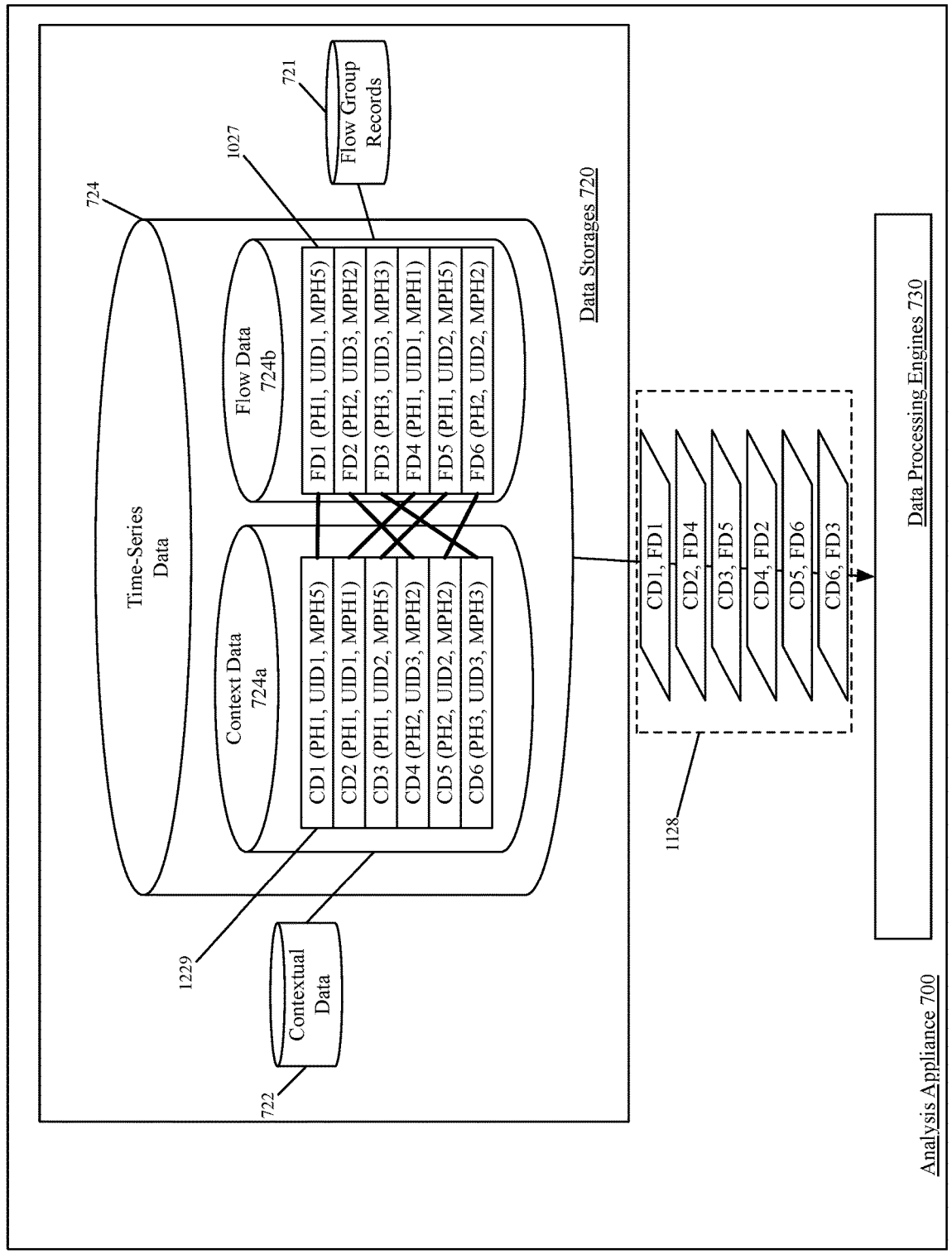
FIG. 12 illustrates a correlation based on correlation data sets.

FIG. 12 illustrates a correlation based on correlation data sets (i.e., correlation keys). FIG. 12 illustrates a time-series-data storage 724, including a context data storage 724*a* and a flow data storage 724*b*. The context data storage 724*a* stores a context data table 1229 that stores different context data sets each tagged with a correlation data set (i.e., a process hash, user ID, and process instance identifier [modified process hash, MPHX] in the illustrated embodiment). Flow data storage 724*b* stores a flow-data table 1027 for storing flow data records tagged with the correlation data set in the illustrated embodiment (i.e., a process hash, user ID, and process instance identifier).

FIG. 12 illustrates that the correlation data is used to identify flow data and context data associated with a same set of correlation data values. As opposed to the correlation keys used in previous examples, the correlation key used in the embodiment illustrated in FIG. 12 includes a process instance identifier (MPHX) that allows each record to be unambiguously identified with a particular context data record. The correlated data 1228, in this case, is sent to a set of data processing engines in the group of data processing engines 730 as a set of separate data sets for each correlated context data/flow record pair without including the correlation data set because the context data includes the information in the correlation data set and the data has already been correlated. In the illustrated embodiment, each context data record is associated with a single flow data record. However, one of ordinary skill in the art would understand that in some embodiments, a single flow record is associated with multiple contextual attribute sets and additionally, or alternatively, a single contextual attribute set is associated with multiple flow records.

Figure 13:
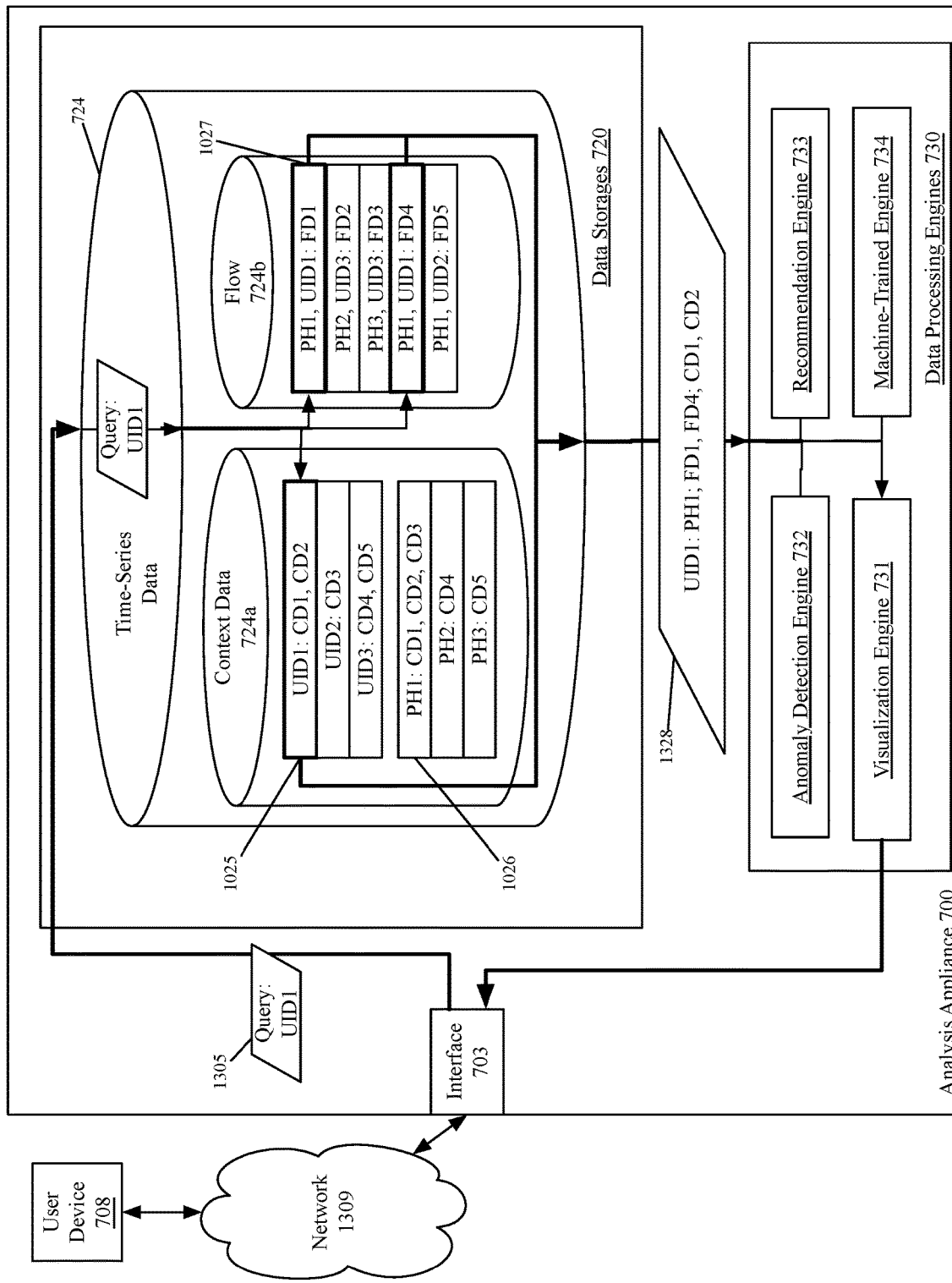
FIG. 13 illustrates a correlation operation in response to a request from a user for data regarding a particular user.

FIG. 13 illustrates a correlation operation in response to a request from a user for data regarding a particular user. As in the illustrated embodiment, the request is for a report on the activity of a particular user. Additionally, or alternatively, the request is for a recommendation for policies (e.g., firewall rules) for the user. FIG. 13 includes additional elements of FIG. 7 that are relevant to the illustrated function. A user sends a request 1305 for data regarding a particular user ID (UID1) to the analysis appliance 700 from user device 708 through a network 1309 and interface 703 of the analysis appliance 700. The time-series-data storage 724 identifies records associated with UID1 and provides them to a visualization engine 731 for presentation to the user on user device 708. In other embodiments, the correlated data 1328 is provided to multiple data processing engines (e.g., visualization engine 731, recommendation engine 733, and machine-trained engine 734) to provide different services. In the illustrated embodiment, the correlated data 1328 is a concatenated set of data sets (PH1; FD1, FD4; CD1, CD2) associated with the UID that was the subject of the user request. One of ordinary skill in the art will understand that the examples provided above in FIGS. 10-13 are for illustrative purposes and are not meant as an exhaustive list of correlation operations or outputs.

Returning to the discussion of FIG. 7, anomaly detection engine 732, in some embodiments, performs anomaly detection based on sets of attributes received from host computers 706. Anomaly detection engine 732, in some embodiments, analyzes the incoming flow data to detect anomalous behavior. The analysis, in some embodiments, is performed after a deduplication/aggregation operation on the flow group records stored in one (or both) of the correlated flow group record storage 721 and the time-series-data storage 724. In some embodiments, the analysis identifies flows for further investigation by an administrator.

In some embodiments, a set of flow group records include an indication of anomalous behavior that is used to select flow group records for further anomalous behavior analysis. In some embodiments, the anomalous behavior indication is a flag bit that indicates anomalous behavior detection at a host computer. The anomalous behavior indication, in other embodiments, is provided as a value that indicates a type of anomalous behavior detected. The various types of anomalous behavior include, in some embodiments, one of: (1) an indication that a newly added service rule was not used to process at least one flow in the particular group of flows to which the newly added service rule applies, (2) that a default service rule was used to process at least one flow in the particular group of flows, (3) that at least one source machine of a flow in a particular group of flows has not been microsegmented, (4) that no service rule has been specified for communications between a source and destination machine of at least one flow in the particular group of flows, (5) that a port associated with at least one flow in the particular group of flows does not match a port expected based on an application associated with the at least one flow, (6) that a previously blocked flow has been allowed, (7) that an insecure version of an application has been used, (8) that an application or URL related to a flow group record has a bad reputation score, and (9) that an irregularity was detected with a protocol (e.g., TCP) header. Additional types of anomalous behavior that are provided, in some embodiments, will be appreciated by one of ordinary skill in the art.

The analysis, in some embodiments, is also performed based on other received data sets (e.g., contextual attribute data sets and configuration data sets that, in some embodiments, have already been correlated with the flow group records), stored flow group records from the time-series-data storage, or any combination of the above. The contextual attribute data sets, in some embodiments, include attributes that are not found in headers (e.g., layer 2-layer 4 headers) of data messages. For example, process identifiers, process hashes, CPU and memory usage, and other contextual attributes discussed above. In some embodiments, the configuration data is used to identify service rules in effect at the time the flows were collected. The analysis, in some embodiments, includes at least one of identifying flows that appear to break service rules identified from the configuration data and identifying large amounts of data exchanged between two machines (e.g., as an FTP put or an HTTP POST). The result of the analysis, in some embodiments, is an alert regarding the anomalous behavior to an administrator.

Some embodiments also provide a recommendation engine to produce recommendations for an administrator. The recommendation engine, in some embodiments, provides data for machine learning and uses machine-trained networks to make recommendations. In some embodiments, the recommendations include a group to which a particular machine should be added, a new group that should be created for a particular set of machines, or a set of service rules (e.g., firewall rules) based on existing groups and data messages detected (e.g., unmicrosegmented data flows). In some embodiments, the recommendation engine identifies unmicrosegmented machines and suggests specific service rules for microsegmentation or makes a general recommendation that microsegmentation may be desirable to an administrator among a set of machines.

In some embodiments, a visualization engine is provided to present a visual representation of machines as members of groups and to represent communications between machines. The visualization processing, in some embodiments, also includes generating a graphical user interface that can be used to select groups of machines, domains, or individual machines and display contextual attributes relevant to the selected group, domain, or machine. In some embodiments, the context data is displayed based on a mouse-over (e.g., hover) operation in which a mouse (e.g., pointer) is moved over a machine, domain, or group to select it for display of contextual attributes which triggers a window to appear over the previous graphical representation with the contextual attributes displayed in the window. In some embodiments, flows between machines are also presented visually and can be selected or a mouse-over can be used to display additional contextual attributes of a selected flow. Other display options (e.g., lists, tables, etc.) are used in addition to, or in place of, the described mouse over. Some visualizations provide insight into particular process and command line combinations that are related to flows between the visualized machines based on the correlated data sets, including the process instance identifier.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
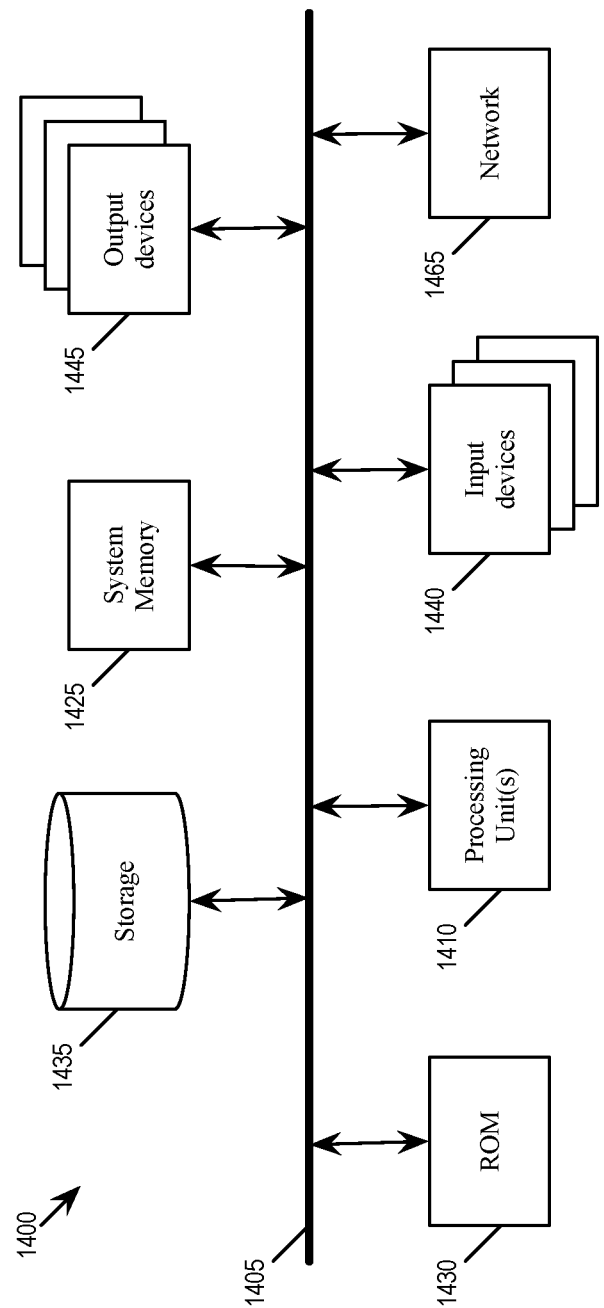
FIG. 14 conceptually illustrates a computer system with which some embodiments of the invention are implemented.

FIG. 14 conceptually illustrates a computer system 1400 with which some embodiments of the invention are implemented. The computer system 1400 can be used to implement any of the above-described hosts, controllers, and managers. As such, it can be used to execute any of the above described processes. This computer system includes various types of non-transitory machine readable media and interfaces for various other types of machine readable media. Computer system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the computer system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments. The read-only-memory (ROM) 1430 stores static data and instructions that are needed by the processing unit(s) 1410 and other modules of the computer system. The permanent storage device 1435, on the other hand, is a read-and-write memory device. This device is a non-volatile memory unit that stores instructions and data even when the computer system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory 1425 is a volatile read-and-write memory, such as a random access memory. The system memory 1425 stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices 1440 enable the user to communicate information and select commands to the computer system 1400. The input devices 1440 include alphanumeric keyboards and pointing devices (also called "cursor control devices"). The output devices 1445 display images generated by the computer system 1400. The output devices 1445 include printers and display devices, such as cathode ray tubes (CRT) or liquid crystal displays (LCD). Some embodiments include devices such as a touchscreen, which function as both input and output devices.

Finally, as shown in FIG. 14, bus 1405 also couples computer system 1400 to a network 1465 through a network adapter (not shown). In this manner, the computer system 1400 can be a part of a network of computers (such as a local area network ("LAN"), a wide area network ("WAN"), an Intranet, or a network of networks, such as the Internet. Any or all components of computer system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for reporting attributes of data flows associated with machines executing on a host computer, the method comprising:

at a set of one or more servers operating outside of the host computer:

receiving, through a first communication from the host computer, a set of contextual attributes associated with a set of one or more data message flows, wherein the set of contextual attributes comprises at least one of an identifier for a process requesting the set of data message flows, and a command line interface (CLI) parameter associated with the request, wherein the set of contextual attributes comprise a plurality of attributes collected from a guest introspection agent executing on a machine that executes on the host computer and that is associated with the set of data message flows;

receiving, through a separate, second communication from the host computer, a set of statistics collected at the host computer for the set of data message flows and a key to correlate the received set of statistics and the received set of contextual attributes, wherein a flow exporter that executes on the host computer collects the set of statistics relating to the set of data message flows, and iteratively performs a first aggregation operation to aggregate collected sets of statistics for the set of data message flows before iteratively sending aggregated set of statistics to the set of servers;

using the key to correlate the received set of statistics and the contextual attributes.

2. The method of claim 1, wherein the key comprises a subset of one or more received contextual attributes.

3. The method of claim 1, wherein the key further comprises a value generated based on the process identifier.

4. The method of claim 1, wherein the flow exporter collected statistics for flows that match a set of flow identifiers that identify flows for which the flow exporter has to collect statistics.

5. The method of claim 1 further comprising at the set of servers iteratively performing a second aggregation operation to aggregate different sets of statistics that the flow exporter provides for the set of data message flows.

6. The method of claim 1, wherein the host computer is a first host computer and the set of statistics is a first set of statistics, the method further comprising collecting a second set of statistics from a second host computer regarding the set of data message flows, and associating the second set of statistics with the first set of statistics received from the first host computer.

7. The method of claim 1, wherein the report comprises at least one of anomaly detection and vulnerability analysis.

8. The method of claim 1, wherein the report produces a visualization of data relevant to a user query.

9. The method of claim 1, wherein the contextual attributes comprises L7 attributes that are used to identify (1) applications on different machines that are communicating and (2) the type of data being exchanged.

10. The method of claim 1 further comprising receiving and correlating sets of statistics and contextual attributes from multiple host computers to generate an aggregated set of statistics.

11. A non-transitory machine readable medium storing a server program for collecting attributes of data flows associated with machines executing on host computers, the program for execution by a first host computer, receiving, through a first communication from a second host computer, a set of contextual attributes associated with a set of one or more data message flows, wherein the set of contextual attributes comprises at least one of an identifier for a process requesting the set of data message flows, and a command line interface (CLI) parameter associated with the request, wherein the set of contextual attributes comprise a plurality of attributes collected from a guest introspection agent executing on a machine that executes on the host computer and that is associated with the set of data message flows;

receiving, through a separate, second communication from the second host computer, a set of statistics collected at the second host computer for the set of data message flows and a key to correlate the received set of statistics and the received set of contextual attributes, wherein a flow exporter that executes on the host computer collects the set of statistics relating to the set of data message flows, and iteratively performs a first aggregation operation to aggregate collected sets of statistics for the set of data message flows before iteratively sending aggregated set of statistics to the set of servers;

using the key to correlate the received set of statistics and the contextual attributes.

12. The non-transitory machine readable medium of claim 11, wherein the key comprises a subset of one or more received contextual attributes.

13. The non-transitory machine readable medium of claim 11, wherein the key further comprises a value generated based on the process identifier.

14. The non-transitory machine readable medium of claim 11, wherein the flow exporter collected statistics for flows that match a set of flow identifiers that identify flows for which the flow exporter has to collect statistics.

* * * * *